(12) United States Patent
Ogawa

(10) Patent No.: US 11,187,876 B2
(45) Date of Patent: Nov. 30, 2021

(54) ZOOM LENS AND IMAGE PICKUP APPARATUS

(71) Applicant: CANON KABUSHIKI KAISHA, Tokyo (JP)

(72) Inventor: Naotoshi Ogawa, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/938,061

(22) Filed: Jul. 24, 2020

(65) Prior Publication Data

US 2021/0033833 A1 Feb. 4, 2021

(30) Foreign Application Priority Data

Jul. 30, 2019 (JP) .............................. JP2019-139911

(51) Int. Cl.
 *G02B 15/14* (2006.01)
(52) U.S. Cl.
 CPC ............... *G02B 15/144109* (2019.08); *G02B 15/145125* (2019.08); *G02B 15/145129* (2019.08)
(58) Field of Classification Search
 None
 See application file for complete search history.

(56) References Cited

U.S. PATENT DOCUMENTS

| | | | |
|---|---|---|---|
| 4,110,006 A * | 8/1978 | Ikemori | .......... G02B 15/144111 359/684 |
| 5,808,809 A | 9/1998 | Yahagi | |
| 7,907,355 B2 * | 3/2011 | Kodaira | ............... G02B 27/646 359/775 |
| 10,295,806 B2 | 5/2019 | Miyazawa et al. | |
| 2016/0274340 A1 | 9/2016 | Yonezawa et al. | |
| 2017/0269374 A1 | 9/2017 | Takemoto et al. | |

(Continued)

FOREIGN PATENT DOCUMENTS

| | | |
|---|---|---|
| JP | H09258102 A | 10/1997 |
| JP | H1031157 A | 2/1998 |
| JP | 2012242766 A | 12/2012 |

OTHER PUBLICATIONS

Combined Search and Examination Report under Sections 17 and 18(3) issued by the Intellectual Property Office of Great Britain dated Mar. 30, 2021 in corresponding GB Patent Application No. 2011489.8.

*Primary Examiner* — Darryl J Collins
(74) *Attorney, Agent, or Firm* — Carter, DeLuca & Farrell LLP

(57) ABSTRACT

Provided is a zoom lens including in order from an object side: a positive first lens unit not moving for a change in magnification; a negative second lens unit moving for a change in magnification; and two or three rear lens units having a positive refractive power as a whole, at least one of the rear lens units being configured to move for a change in magnification. The first lens unit includes a negative first lens sub-unit not moving for focusing, a positive second lens sub-unit moving for focusing, a third lens sub-unit not moving for focusing, and a positive fourth lens sub-unit moving for focusing. An amount of movement of the second lens sub-unit during focusing from infinity to a minimum object distance, and an amount of movement of the fourth lens sub-unit during focusing from infinity to the minimum object distance satisfy a specific conditional expression.

10 Claims, 11 Drawing Sheets

(56) References Cited

U.S. PATENT DOCUMENTS

| | | |
|---|---|---|
| 2019/0064489 A1 | 2/2019 | Tanaka |
| 2019/0265447 A1 | 8/2019 | Hori et al. |
| 2019/0265448 A1 | 8/2019 | Ogawa et al. |
| 2019/0265451 A1 | 8/2019 | Shimomura et al. |
| 2020/0158997 A1 | 5/2020 | Hori et al. |

* cited by examiner

ZOOM LENS AND IMAGE PICKUP APPARATUS

BACKGROUND OF THE INVENTION

Field of the Invention

The present invention relates to a zoom lens and an image pickup apparatus.

Description of the Related Art

In photography for, for example, sports broadcasting or a TV program about nature, an object is often photographed at a distant location, and thus a telephoto zoom lens having a high zoom ratio and a long focal length at a telephoto end is appropriate for such photography. In addition, due to increase in number of pixels of an image pickup element, there is a demand for increase in performance of a telephoto zoom lens, in particular, optical performance over an entire zoom range and an entire focus range. Further, mobility and operability are prioritized in such photography, and thus a zoom lens in which a first lens unit having a positive refractive power, which is used for focusing, is arranged closest to an object side is used in general.

In Japanese Patent Application Laid-Open No. H10-31157, there is disclosed a zoom lens in which a first lens unit includes, in order from an object side, a negative first lens sub-unit, a positive second lens sub-unit, a positive third lens sub-unit, and a positive fourth lens sub-unit, and the second lens sub-unit and the fourth lens sub-unit are moved for focusing at from an object at infinity to an object at a minimum object distance.

In Japanese Patent Application Laid-Open No. 2012-242766, there is disclosed a zoom lens in which a first lens unit includes, in order from an object side, a negative first lens sub-unit, a positive second lens sub-unit, and a positive third lens sub-unit, and the second lens sub-unit and the third lens sub-unit are moved for focusing at from an object at infinity to an object at a minimum object distance.

An image pickup apparatus such as a TV camera or a movie camera is required to be operated remotely, and thus a zoom lens used for such a purpose is desired to have a reduced weight of a lens unit configured to move for focusing.

SUMMARY OF THE INVENTION

An aspect of embodiments provides, for example, a zoom lens beneficial in light weight of a lens unit configured to move for focusing, and high optical performance.

An aspect of the preset invention provides a zoom lens including in order from an object side to an image side: a first lens unit having a positive refractive power and configured not to move for a change in magnification of the zoom lens; a second lens unit having a negative refractive power and configured to move for a change in magnification of the zoom lens; and two or three rear lens units having a positive refractive power as a whole, at least one of the two or three rear lens units being configured to move for a change in magnification of the zoom lens, wherein an interval between lens units in each pair of adjacent two lens units is changed for a change in magnification of the zoom lens, wherein the first lens unit includes a first lens sub-unit having a negative refractive power and configured not to move for focusing of the zoom lens, a second lens sub-unit having a positive refractive power and configured to move for focusing of the zoom lens, a third lens sub-unit configured not to move for focusing of the zoom lens, and a fourth lens sub-unit having a positive refractive power and configured to move for focusing of the zoom lens, and wherein the following conditional expression is satisfied:

$$-10.0 < M12/M14 < -0.1,$$

where M12 represents an amount of movement of the second lens sub-unit for focusing of the zoom lens from infinity to a minimum object distance, and M14 represents an amount of movement of the fourth lens sub-unit for focusing of the zoom lens from infinity to the minimum object distance.

Further features of the present invention will become apparent from the following description of exemplary embodiments with reference to the attached drawings.

DESCRIPTION OF THE EMBODIMENTS

Now, exemplary embodiments of the present invention are described in detail with reference to the attached drawings. Each of the embodiments of the present invention described below can be implemented solely or as a combination of a plurality of the embodiments or features thereof where necessary or where the combination of elements or features from individual embodiments in a single embodiment is beneficial.

Figure 1:
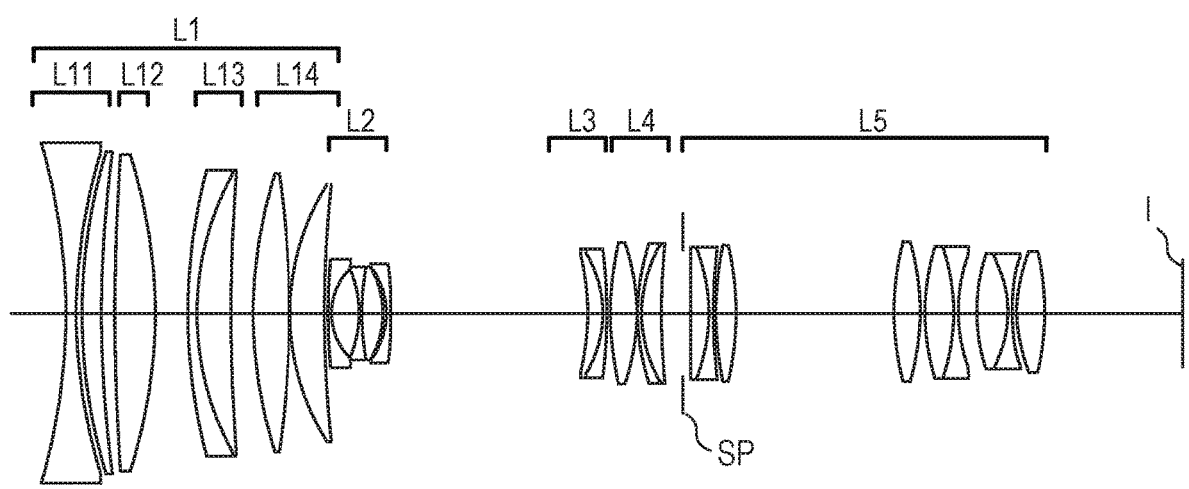
FIG. 1 is a cross-sectional view at a wide angle end and at a time of focusing at infinity in Embodiment 1 of the present invention.
Figure 2A:
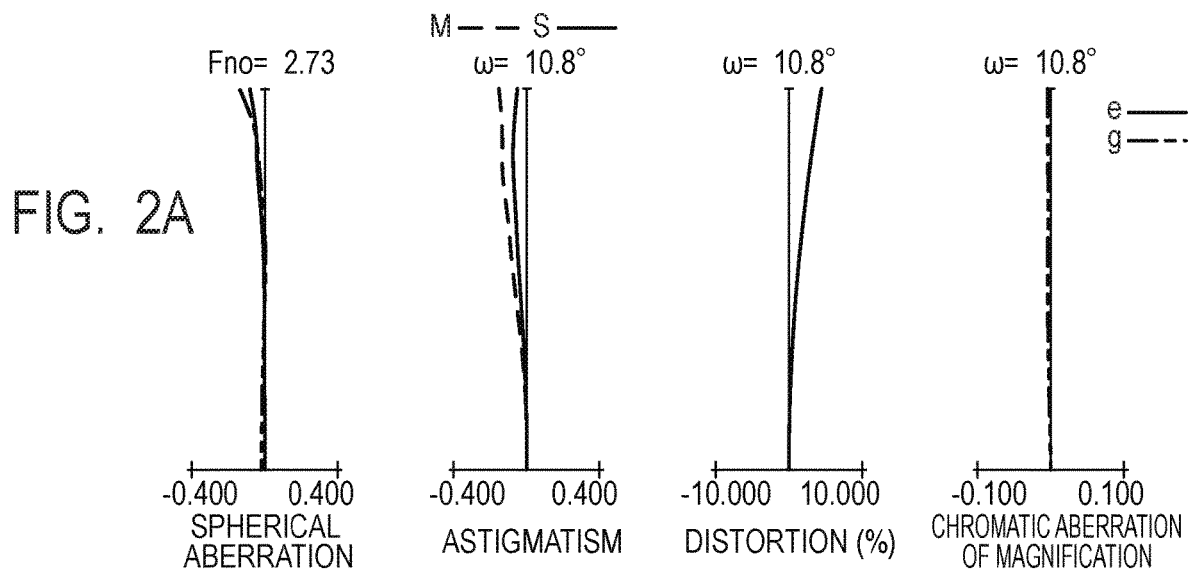
FIG. 2A shows aberration diagrams at the wide angle end and at the time of focusing at infinity in Embodiment 1.
Figure 2B:
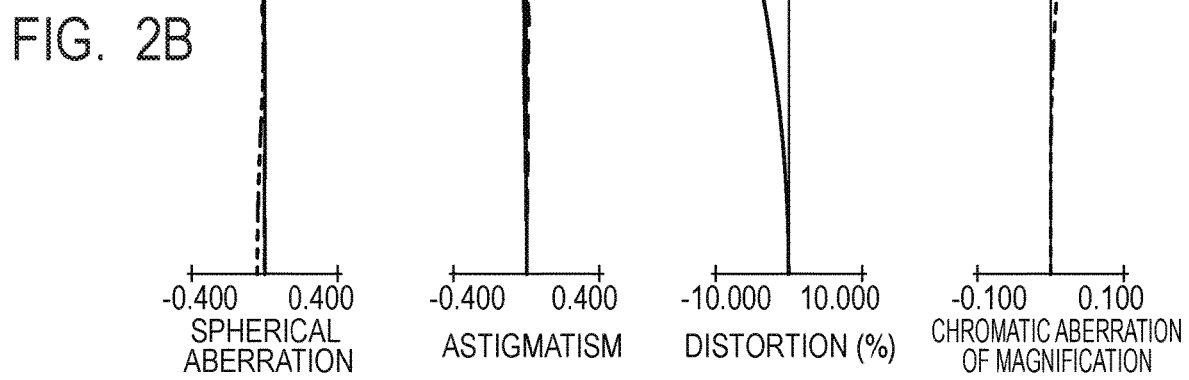
FIG. 2B shows aberration diagrams at a focal length of 77 mm and at the time of focusing at infinity in Embodiment 1.
Figure 2C:
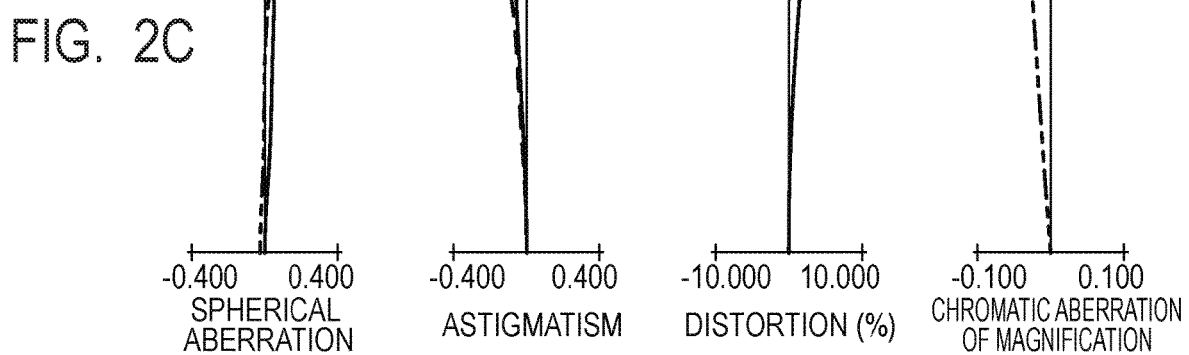
FIG. 2C shows aberration diagrams at a telephoto end and at the time of focusing at infinity in Embodiment 1.

FIG. 1 is a lens cross-sectional view at a wide angle end and at a time of focusing on an object at infinity in Numerical Embodiment 1 corresponding to Embodiment 1 of the present invention. FIG. 2A, FIG. 2B, and FIG. 2C show longitudinal aberration diagrams at the wide angle end, a focal length of 77 mm, and a telephoto end and at the time of focusing on the object at infinity in Numerical Embodiment 1, respectively. In each longitudinal aberration diagram, spherical aberration is shown with respect to an e-line (represented by the solid line) and a g-line (represented by the two-dot chain line). Astigmatism is shown on a meridional image plane (represented by the broken line) with respect to the e-line and a sagittal image plane (represented by the solid line) with respect to the e-line. Chromatic aberration of magnification is shown with respect to a g-line (represented by the two-dot chain line). An F-number is represented by Fno, and a half angle of view is represented by w. In the longitudinal aberration diagram, spherical aberration, astigmatism, distortion, and chromatic aberration of magnification are shown in scales of 0.4 mm, 0.4 mm, 10%, and 0.1 mm, respectively.

Now, a zoom lens according to Embodiment 1 of the present invention is specifically described with reference to FIG. 1.

In FIG. 1, the zoom lens includes: a lens unit L1 having a positive refractive power, which is not moved for magnification; a lens unit L2 having a negative refractive power, and configured to move (typically monotonously) toward an image side on an optical axis, to thereby perform magnification (zooming) from the wide angle end to the telephoto end; a lens unit L3 having a negative refractive power, which is configured to move from an image side toward an object side on the optical axis between the wide angle end and an intermediate zoom position, and to move from the object side toward the image side on the optical axis between the intermediate zoom position and the telephoto end; and a lens unit L4 having a positive refractive power, which is configured to move on the optical axis between the wide angle end and the telephoto end. The zoom lens further includes a stop SP fixed during magnification and a lens unit L5 having a positive refractive power, which is not moved for magnification, and an image pickup plane I is also illustrated. Each interval between adjacent lens units is changed for magnification. Further, the lens unit L1 consists of a first lens sub-unit L11 having a negative refractive power, a second lens sub-unit L12 having a positive refractive power, a third lens sub-unit L13 having a negative refractive power, and a fourth lens sub-unit L14 having a positive refractive power. The second lens sub-unit L12 is caused to move from the object side toward the image side, and the fourth lens sub-unit L14 is caused to move from the image side toward the object side, to thereby focus on an object at short distance.

The zoom lens according to each Embodiment of the present invention includes, in order from the object side to the image side, a positive first lens unit, a negative second lens unit, and a rear lens unit having a positive refractive power as a whole. The first lens unit includes a first lens sub-unit having a negative refractive power, which is configured not to move for focusing (of the zoom lens), a second lens sub-unit having a positive refractive power, which is configured to move on the optical axis at the time of focusing, a third lens sub-unit, and a fourth lens sub-unit having a positive refractive power, which is configured to move on the optical axis at the time of focusing. The first lens unit satisfies the following conditional expression:

$$-10.0<M12/M14<-0.1 \tag{1}$$

where M12 represents an amount of movement of the second lens sub-unit at the time of focusing from the object at infinity to an object at a minimum object distance, and M14 represents an amount of movement of the fourth lens sub-unit at the time of focusing from the object at infinity to the object at the minimum object distance.

Next, a technical meaning of this configuration is described.

Conditional Expression (1) defines a condition for satisfying both of reduction of an effective diameter of the first lens unit L1 and reduction of the entire thickness while at the same time achieving satisfactory optical performance.

When the ratio of Conditional Expression (1) exceeds the upper limit of Conditional Expression (1), the amount of movement of the second lens sub-unit becomes relatively smaller. As a result, positions of an off-axial light, which passes through the first lens sub-unit to the third lens sub-unit, of the object at infinity and the object at the minimum object distance deviate from each other, which causes aberration variation at the time of focusing to become larger.

In contrast, when the ratio of Conditional Expression (1) falls below the lower limit of Conditional Expression (1), the amount of movement of the fourth lens sub-unit becomes relatively smaller. The sum of amounts of movement of the second lens sub-unit and the fourth lens sub-unit becomes larger, which causes the entire thickness of the first lens unit to become larger. In other cases, when the refractive power of the first lens sub-unit and the refractive power of the second lens sub-unit are increased in order to reduce the amount of movement of the second lens sub-unit, the effective diameter of the fourth lens sub-unit becomes larger.

It is more preferred to set Conditional Expression (1) as follows.

$$-5.0<M12/M14<-0.3 \tag{1a}$$

Further, in each Embodiment of the present invention, it is desired to satisfy the following conditional expression:

$$-1.5<F11/F12<-0.5 \tag{2}$$

where F11 represents a focal length of the first lens sub-unit, and F12 represents a focal length of the second lens sub-unit.

Conditional Expression (2) defines a condition for reducing the size and weight of the zoom lens by defining a ratio of the focal length of the first lens sub-unit to the focal length of the second lens sub-unit to set the effective diameters of the first lens sub-unit and the fourth lens sub-unit to appropriate sizes.

When the ratio of Conditional Expression (2) exceeds the upper limit of Conditional Expression (2), the refractive power of the first lens sub-unit becomes too large, and the height of an on-axial light passing through the fourth lens sub-unit on the telephoto side becomes larger, which causes the effective diameter of the fourth lens sub-unit to become larger.

In contrast, when the ratio of Conditional Expression (2) falls below the lower limit of Conditional Expression (2), the refractive power of the first lens sub-unit becomes too small, and an image side principal point position (rear principal point position) of the entire first lens unit is positioned on the object side, which causes the effective diameter of the entire first lens unit to become larger.

Further, in each Embodiment of the present invention, it is desired to satisfy the following conditional expression:

$$1.0 < F14/F1 < 2.0 \qquad (3)$$

where F1 represents a focal length of the first lens unit, and F14 represents a focal length of the fourth lens sub-unit.

Conditional Expression (3) defines a condition for reducing the size and weight of the zoom lens by setting the effective diameters of the first lens sub-unit and the fourth lens sub-unit to appropriate sizes.

When the ratio of Conditional Expression (3) exceeds the upper limit of Conditional Expression (3), the refractive power of the fourth lens sub-unit becomes too large, and aberration varies at the time of focusing becomes larger. In other cases, the height of an on-axial light passing through the fourth lens sub-unit on the telephoto side becomes larger, which causes the effective diameter of the fourth lens sub-unit to become larger.

In contrast, when the ratio of Conditional Expression (3) falls below the lower limit of Conditional Expression (3), the refractive power of the fourth lens sub-unit becomes too small, and the image side principal point position of the entire first lens unit is positioned on the object side, which causes the effective diameter of the entire first lens unit to become larger.

Further, in each Embodiment of the present invention, it is desired to satisfy the following conditional expression:

$$50.0 < vdP13 - vdN13 < 78.0 \qquad (4)$$

where vdP13 represents an average abbe number of the positive lens of the third lens sub-unit, and vdN13 represents an average abbe number of the negative lens of the third lens sub-unit.

An Abbe number "vd" is represented by the following expression:

$$vd = (Nd-1)/(NF-NC),$$

where NF, Nd, and NC represent refractive indices with respect to an F-line (wavelength: 486.1 nm), a d-line (wavelength: 587.6 nm), and a C-line (wavelength: 656.3 nm) of the Fraunhofer lines, respectively.

Conditional Expression (4) defines a condition for reducing the size and weight of the zoom lens and satisfactorily correcting axial chromatic aberration at the telephoto end by setting the average abbe number of the positive lens and the average abbe number of the negative lens of the third lens sub-unit to an appropriate range.

When the value of Conditional Expression (4) exceeds the upper limit of Conditional Expression (4), the average abbe number of the negative lens becomes too small, and it becomes difficult to correct the axial chromatic aberration at the telephoto end.

In contrast, when the value of Conditional Expression (4) falls below the lower limit of Conditional Expression (4), a difference in average abbe number between the positive lens and the negative lens becomes too small, and the refractive power of each lens becomes larger. As a result, the size of the third lens sub-unit and the effective diameter of the entire first lens unit become larger, and it becomes difficult to reduce the size and weight of the zoom lens.

Further, in each Embodiment of the present invention, it is desired to satisfy the following conditional expression:

$$-10.0 < F1/F2 < -2.0 \qquad (5)$$

where F1 represents the focal length of the first lens unit, and F2 represents a focal length of the second lens unit.

Conditional Expression (5) defines a condition for reducing the size and weight of the zoom lens and suppressing variation in various kinds of aberrations due to magnification by defining a focal length ratio of the first lens unit to the second lens unit.

When the ratio of Conditional Expression (5) exceeds the upper limit of Conditional Expression (5), the focal length of the second lens unit becomes relatively too long, and thus the amount of movement of the second lens unit and the size of the lens become larger.

In contrast, when the ratio of Conditional Expression (5) falls below the lower limit of Conditional Expression (5), the focal length of the second lens unit becomes relatively too short, and thus it becomes difficult to suppress variation in various kinds of aberrations due to magnification.

Further, in each Embodiment of the present invention, it is desired to satisfy the following conditional expression:

$$50.0 < vdP12 < 95.1 \qquad (6)$$

where vdP12 represents an average abbe number of the positive lens of the second lens sub-unit.

Conditional Expression (6) defines a condition for suppressing variation in chromatic aberration at the time of focusing by defining the average abbe number of the second lens sub-unit configured to move at the time of focusing.

Further, in each Embodiment of the present invention, it is desired to satisfy the following conditional expression:

$$-40.0 < vdP11 - vdN11 < -10.0 \qquad (7)$$

where vdP11 represents an average abbe number of the positive lens of the first lens sub-unit, and vdN11 represents an average abbe number of the negative lens of the first lens sub-unit.

Conditional Expression (7) defines a condition for reducing the size and weight of the zoom lens and suppressing variation in various kinds of aberrations due to magnification and focusing by setting the average abbe numbers of the positive lens and the negative lens of the first lens sub-unit to an appropriate range.

When the value of Conditional Expression (7) exceeds the upper limit of Conditional Expression (7), a difference in average abbe number between the positive lens and the negative lens becomes too small, and the refractive power of each lens becomes larger. As a result, the size of the first lens sub-unit become larger, and the curvature radius of a lens forming the first lens unit become too small, and it becomes difficult to reduce the size and weight of the zoom lens and suppress variation in various kinds of aberrations.

In contrast, when the value of Conditional Expression (7) falls below the lower limit of Conditional Expression (7), a difference in average abbe number between the positive lens and the negative lens becomes too large, and the refractive power of each lens becomes smaller. As a result, the image side principal point position of the entire first lens unit is positioned on the object side, which causes the effective diameter of the entire first lens unit to become larger and results in a difficulty in reducing the size and weight of the zoom lens.

Embodiment 1

In FIG. 1, the zoom lens includes: a lens unit L1 having a positive refractive power, which is not moved for magnification; a lens unit L2 having a negative refractive power, and configured to move (typically monotonously) toward the image side on the optical axis, to thereby perform magnification (zooming) from the wide angle end to the telephoto end; a lens unit L3 having a negative refractive power, which is configured to move from the image side toward the object side on the optical axis between the wide angle end and the intermediate zoom position, and to move from the object side toward the image side on the optical axis between the intermediate zoom position and the telephoto end; and a lens unit L4 having a positive refractive power, which is configured to move on the optical axis between the wide angle end and the telephoto end. The zoom lens further includes a stop SP fixed during magnification and a lens unit L5 having a positive refractive power, which is not moved for magnification, and an image pickup plane I is also illustrated.

Further, the lens unit L1 consists of a first lens sub-unit L11 having a negative refractive power, a second lens sub-unit L12 having a positive refractive power, a third lens sub-unit L13 having a negative refractive power, and a fourth lens sub-unit L14 having a positive refractive power. The second lens sub-unit L12 is caused to move from the object side toward the image side, and the fourth lens sub-unit L14 is caused to move from the image side toward the object side, to thereby focus on an object at short distance.

The lens unit L1 corresponds to first to thirteenth surfaces. The first lens sub-unit L11 corresponds to first to fourth surfaces, and consists of one negative lens and one positive lens. The second lens sub-unit L12 corresponds to fifth and sixth surfaces, and consists of one positive lens. The third lens sub-unit L13 corresponds to seventh to ninth surfaces, and consists of one positive lens and one negative lens. The fourth lens sub-unit L14 corresponds to tenth to thirteenth surfaces, and consists of two positive lenses.

The lens unit L2 corresponds to fourteenth to twentieth surfaces, and consists of three negative lenses and one positive lens. The lens unit L3 corresponds to twenty-first to twenty-third surfaces, and consists of one negative lens and one positive lens. The lens unit L4 corresponds to twenty-fourth to twenty-eighth surfaces, and consists of one negative lens and two positive lenses. The lens unit L5 corresponds to twenty-ninth to forty-fourth surfaces, and consists of three negative lenses and six positive lenses.

The closest distance in Embodiment 1 is a distance of 1.2 m from an image pickup surface. In this case, the amount of movement of the second lens sub-unit is M12=8.24 mm, and the amount of movement of the fourth lens sub-unit is M14=−4.91 mm. Thus, M12/M14=−1.68, and Conditional Expression (1) is satisfied. Regarding focusing at from the object at infinity to the object at the closest distance, the amount m12 of movement of the second lens sub-unit and the amount m14 of movement of the fourth lens sub-unit at each in-focus position with respect to a position at the time of focusing on the object at infinity satisfy the following relationship:

$m12=-1.68 \times m14.$

The above-mentioned relationship is one example, and m12 and m14 are not required to have a linear relationship.

Values corresponding to the respective conditional expressions in Embodiment 1 are shown in Table 1. Embodiment 1 satisfies Conditional Expression (1) to Conditional Expression (7), and achieves high operability and reduction in size and weight of the zoom lens while at the same time achieving high optical performance.

Embodiment 2

Figure 3:
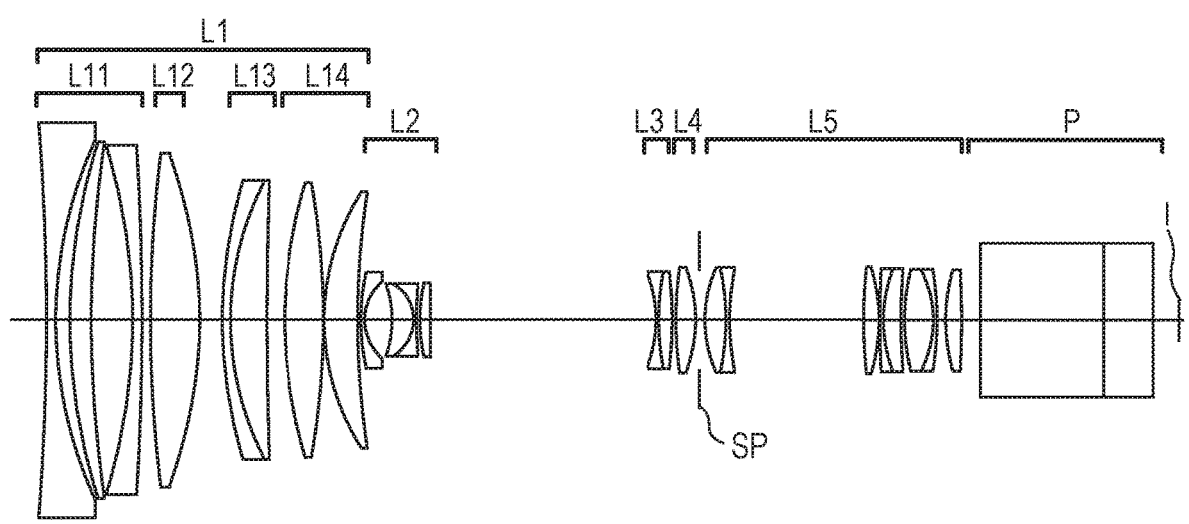
FIG. 3 is a cross-sectional view at a wide angle end and at the time of focusing at infinity in Embodiment 2 of the present invention.
Figure 4A:
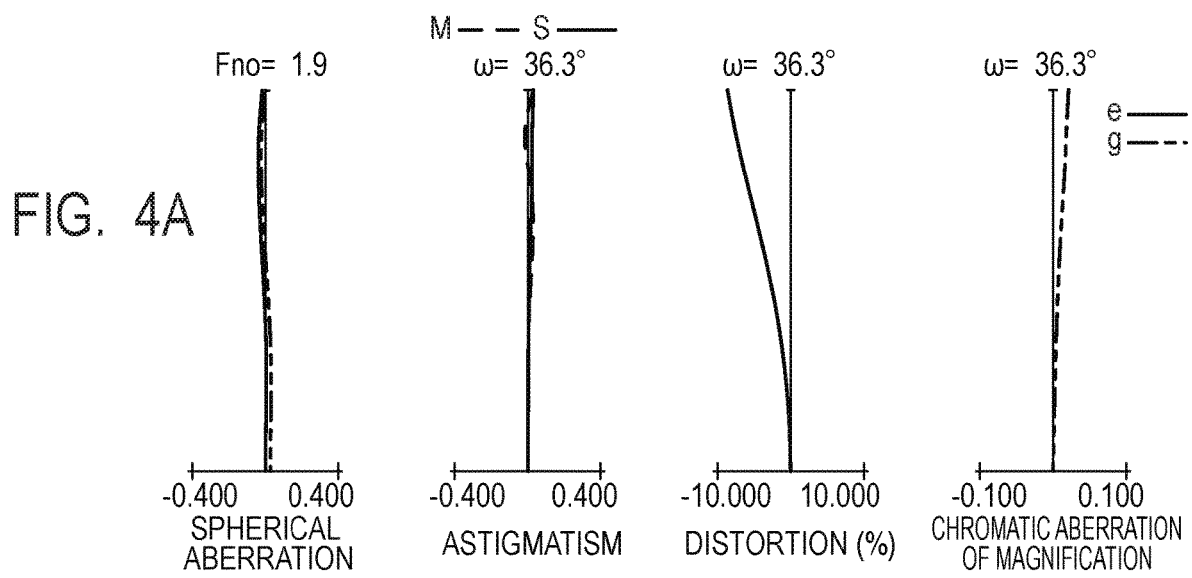
FIG. 4A shows aberration diagrams at the wide angle end and at the time of focusing at infinity in Embodiment 2.
Figure 4B:
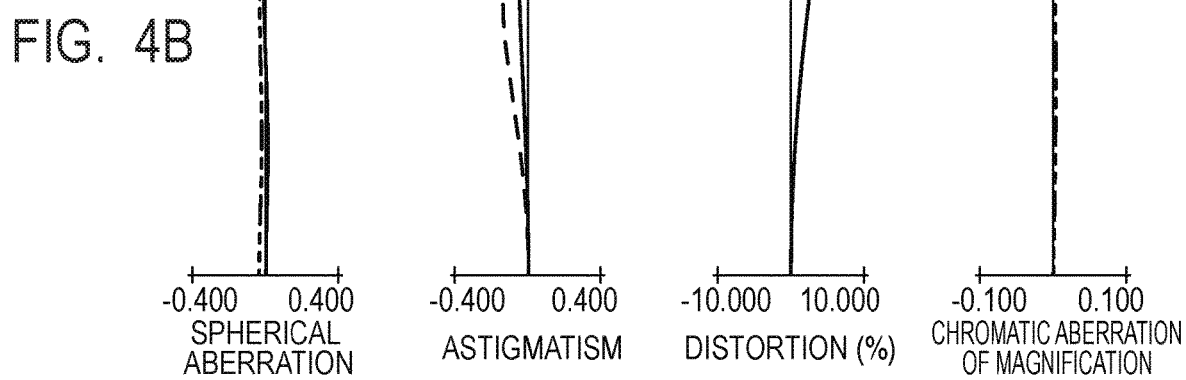
FIG. 4B shows aberration diagrams at a focal length of 33 mm and at the time of focusing at infinity in Embodiment 2.
Figure 4C:
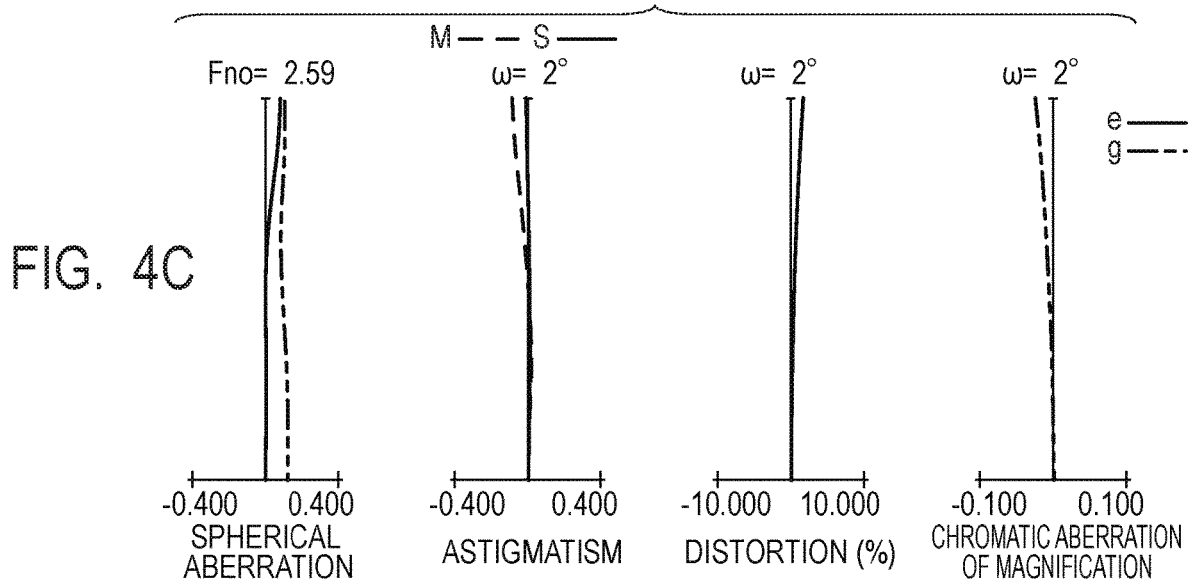
FIG. 4C shows aberration diagrams at a telephoto end and at the time of focusing at infinity in Embodiment 2.

In FIG. 3, the zoom lens includes: a lens unit L1 having a positive refractive power, which is not moved for magnification; a lens unit L2 having a negative refractive power, and configured to move (typically monotonously) toward the image side on the optical axis, to thereby perform magnification (zooming) from the wide angle end to the telephoto end; a lens unit L3 having a negative refractive power, which is configured to move from the image side toward the object side on the optical axis between the wide angle end and the intermediate zoom position, and to move from the object side toward the image side on the optical axis between the intermediate zoom position and the telephoto end; and a lens unit L4 having a positive refractive power, which is configured to move on the optical axis between the wide angle end and the telephoto end. The zoom lens further includes a stop SP fixed during magnification and a lens unit L5 having a positive refractive power, which is not moved for magnification. The zoom lens further includes a color separating prism or optical filter P, for example, and is shown as a glass block in FIG. 3. An image pickup plane I is also illustrated.

Further, the lens unit L1 consists of a first lens sub-unit L11 having a negative refractive power, a second lens sub-unit L12 having a positive refractive power, a third lens sub-unit L13 having a positive refractive power, and a fourth lens sub-unit L14 having a positive refractive power. The second lens sub-unit L12 is caused to move from the object side toward the image side, and the fourth lens sub-unit L14 is caused to move from the image side toward the object side, to thereby focus on an object at short distance.

The lens unit L1 corresponds to first to fifteenth surfaces. The first lens sub-unit L11 corresponds to first to sixth surfaces, and consists of two negative lenses and one positive lens. The second lens sub-unit L12 corresponds to seventh and eighth surfaces, and consists of one positive lens. The third lens sub-unit L13 corresponds to ninth to eleventh surfaces, and consists of one positive lens and one negative lens. The fourth lens sub-unit L14 corresponds to twelfth to fifteenth surfaces, and consists of two positive lenses.

The lens unit L2 corresponds to sixteenth to twenty-second surfaces, and consists of two negative lenses and two positive lenses. The lens unit L3 corresponds to twenty-third to twenty-fifth surfaces, and consists of one negative lens and one positive lens. The lens unit L4 corresponds to twenty-sixth and twenty-seventh surfaces, and consists of one positive lens. The lens unit L5 corresponds to twenty-eighth to forty-first surfaces, and consists of three negative lenses and five positive lenses.

The closest distance in Embodiment 2 is a distance of 0.85 m from the first lens surface. In this case, the amount of movement of the second lens sub-unit is M12=4.97 mm, and the amount of movement of the fourth lens sub-unit is M14=−3.74 mm. Thus, M12/M14=−1.33, and Conditional Expression (1) is satisfied. Regarding focusing from the object at infinity to the object at the closest distance, the amount m12 of movement of the second lens sub-unit and the amount m14 of movement of the fourth lens sub-unit at each in-focus position with respect to the position at the time of focusing on the object at infinity satisfy the following relationship:

$m12=-1.33 \times m14.$

The above-mentioned relationship is one example, and m12 and m14 are not required to have a linear relationship.

Values corresponding to the respective conditional expressions in Embodiment 2 are shown in Table 1. Embodiment 2 satisfies Conditional Expression (1) to Conditional Expression (7), and achieves high operability and reduction in size and weight of the zoom lens while at the same time achieving high optical performance.

Embodiment 3

Figure 5:
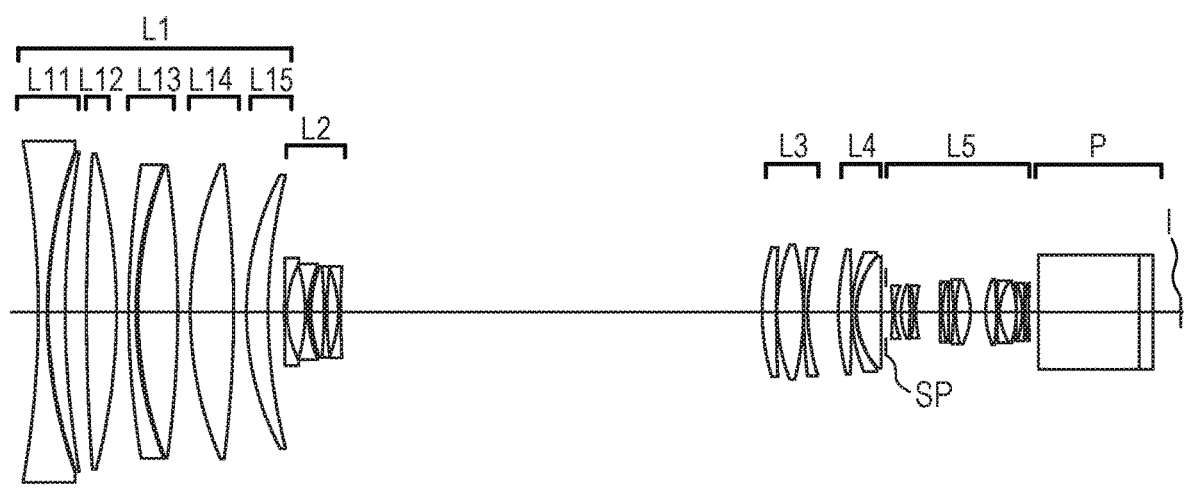
FIG. 5 is a cross-sectional view at a wide angle end and at the time of focusing at infinity in Embodiment 3 of the present invention.
Figure 6A:
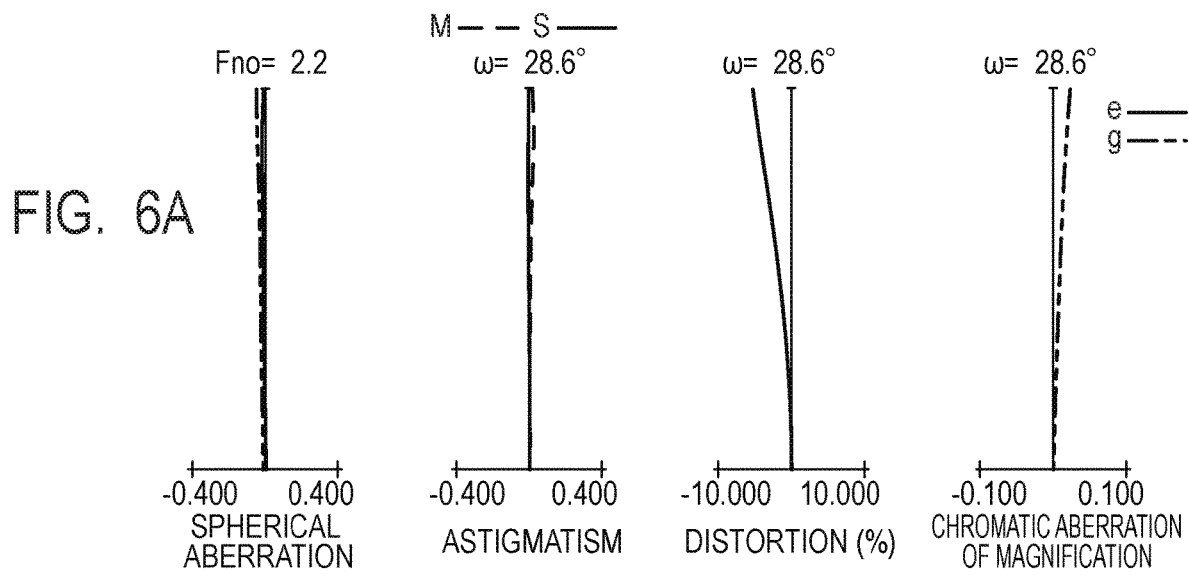
FIG. 6A shows aberration diagrams at the wide angle end and at the time of focusing at infinity in Embodiment 3.
Figure 6B:
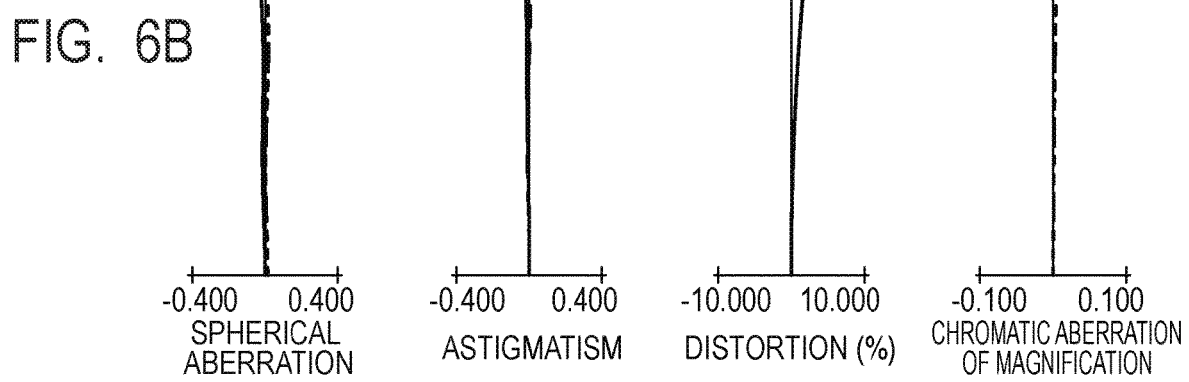
FIG. 6B shows aberration diagrams at a focal length of 95 mm and at the time of focusing at infinity in Embodiment 3.
Figure 6C:
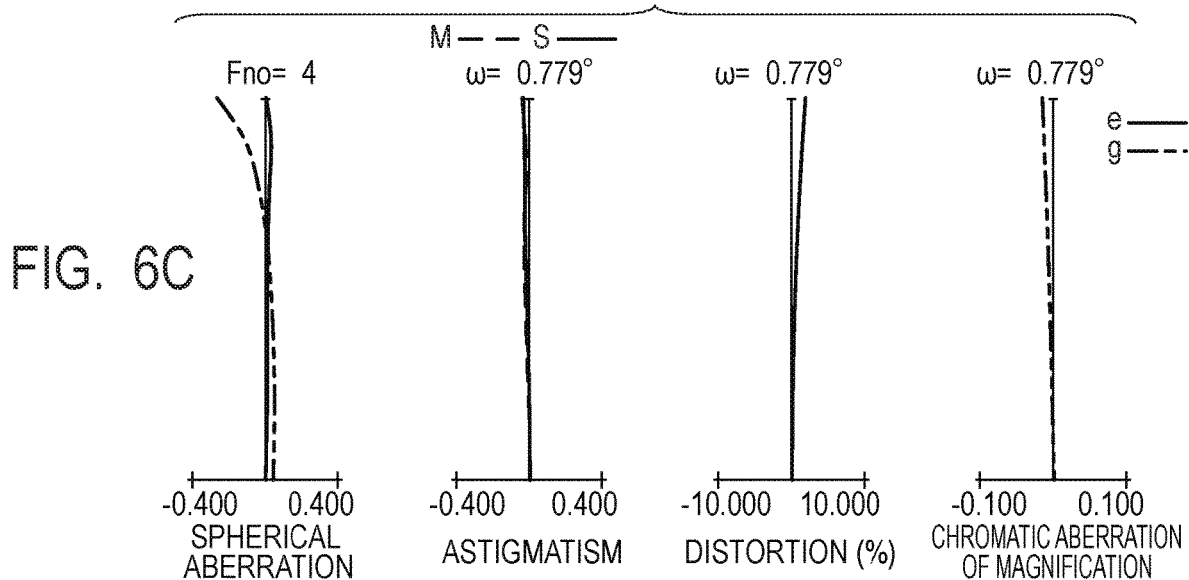
FIG. 6C shows aberration diagrams at a telephoto end and at the time of focusing at infinity in Embodiment 3.

In FIG. 5, the zoom lens includes: a lens unit L1 having a positive refractive power, which is not moved for magnification; a lens unit L2 having a negative refractive power, and configured to move (typically monotonously) toward the image plane side on the optical axis, to thereby perform magnification (zooming) from the wide angle end to the telephoto end; a lens unit L3 having a positive refractive power, which is configured to move from the image side toward the object side on the optical axis from the wide angle end to the telephoto end; and a lens unit L4 having a positive refractive power, which is configured to move from the image side toward the object side on the optical axis from the wide angle end to the telephoto end. The zoom lens further includes a stop SP fixed during magnification and a lens unit L5 having a positive refractive power, which is not moved for magnification. The zoom lens further includes a color separating prism or optical filter P, for example, and is shown as a glass block in FIG. 5. An image pickup plane I is also illustrated.

Further, the lens unit L1 consists of a first lens sub-unit L11 having a negative refractive power, a second lens sub-unit L12 having a positive refractive power, a third lens sub-unit L13 having a positive refractive power, a fourth lens sub-unit L14 having a positive refractive power, and a fifth lens sub-unit L15 having a positive refractive power. The second lens sub-unit L12 is caused to move from the object side toward the image side, the fourth lens sub-unit L14 is caused to move from the image side toward the object side, and the fifth lens sub-unit L15 is caused to move from the image side toward the object side, to thereby focus on the object at short distance.

The lens unit L1 corresponds to first to fourteenth surfaces. The first lens sub-unit L11 corresponds to first to fourth surfaces, and consists of one negative lens and one positive lens. The second lens sub-unit L12 corresponds to fifth and sixth surfaces, and consists of one positive lens. The third lens sub-unit L13 corresponds to seventh to tenth surfaces, and consists of one positive lens and one negative lens. The fourth lens sub-unit L14 corresponds to eleventh and twelfth surfaces, and consists of one positive lens. L15 corresponds to thirteenth and fourteenth surfaces, and consists of one positive lens.

The lens unit L2 corresponds to fifteenth to twenty-third surfaces, and consists of four negative lenses and one positive lens. The lens unit L3 corresponds to twenty-fourth to twenty-ninth surfaces, and consists of one negative lens and two positive lenses. The lens unit L4 corresponds to thirtieth to thirty-fifth surfaces, and consists of one negative lens and two positive lenses. The lens unit L5 corresponds to thirty-sixth to fifty-eighth surfaces, and consists of six negative lenses and seven positive lenses.

The closest distance in Embodiment 3 is a distance of 3.5 m from the first lens surface. In this case, the amount of movement of the second lens sub-unit is M12=12.76 mm, the amount of movement of the fourth lens sub-unit is M14=−17.70 mm, and the amount of movement of the fifth lens sub-unit is M15=−11.14 mm. Thus, M12/M14=−0.72 is satisfied, and Conditional Expression (1) is satisfied. Further, when Conditional Expression (1) is evaluated by setting the fifth lens sub-unit in Embodiment 3 as the fourth lens sub-unit of Conditional Expression (1), M12/M15=−1.15 is satisfied, and Conditional Expression (1) is satisfied also in this case.

Regarding focusing from the object at infinity to the object at the closest distance, the amount m12 of movement of the second lens sub-unit, the amount m14 of movement of the fourth lens sub-unit, and the amount m15 of movement of the fifth lens sub-unit at each in-focus position with respect to the position at the time of focusing on the object at infinity satisfy the following relationships:

$$m14=-1.53 \times m12-0.084 \times m12^2+0.008 \times m12^3; \text{ and}$$

$$m15=-0.86 \times m12+0.048 \times m12^2-0.004 \times m12^3.$$

Corresponding values of the respective conditional expressions in Embodiment 3 are shown in Table 1. Embodiment 3 satisfies Conditional Expression (1) to Conditional Expression (7), and achieves high operability and reduction in size and weight of the zoom lens while at the same time achieving high optical performance.

Embodiment 4

Figure 7:
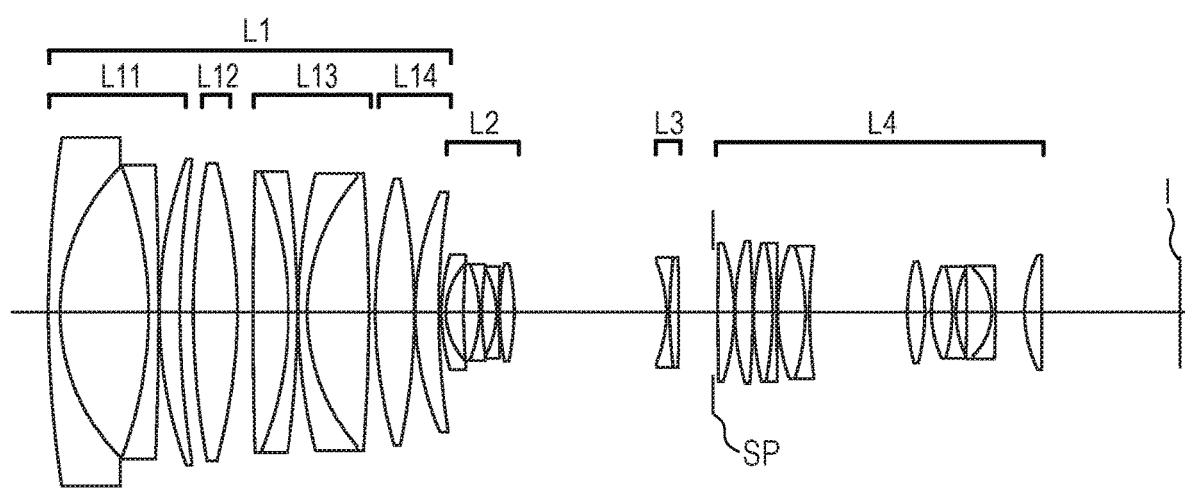
FIG. 7 is a cross-sectional view at a wide angle end and at the time of focusing at infinity in Embodiment 4 of the present invention.
Figure 8A:
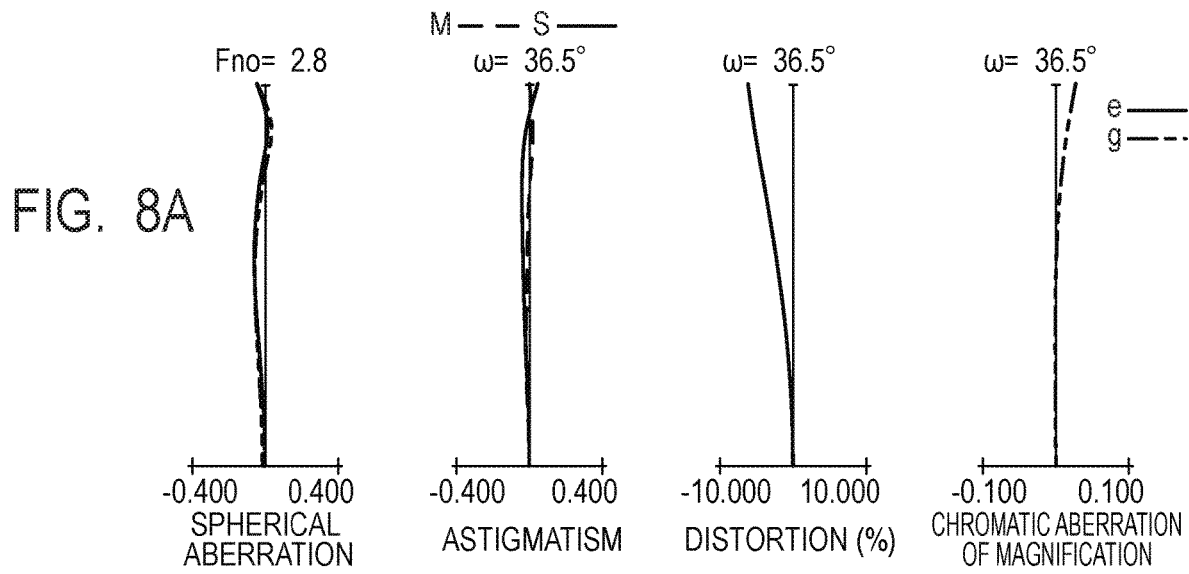
FIG. 8A shows aberration diagrams at the wide angle end and at the time of focusing at infinity in Embodiment 4.
Figure 8B:
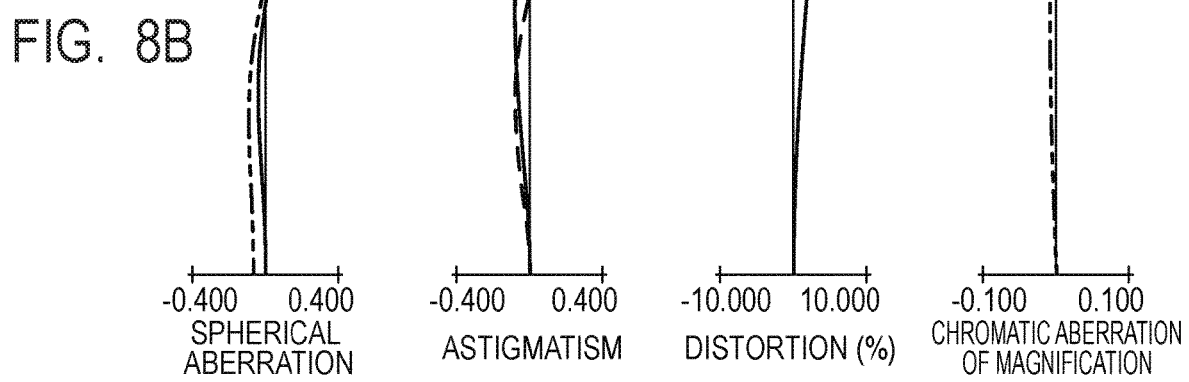
FIG. 8B shows aberration diagrams at a focal length of 70 mm and at the time of focusing at infinity in Embodiment 4.
Figure 8C:
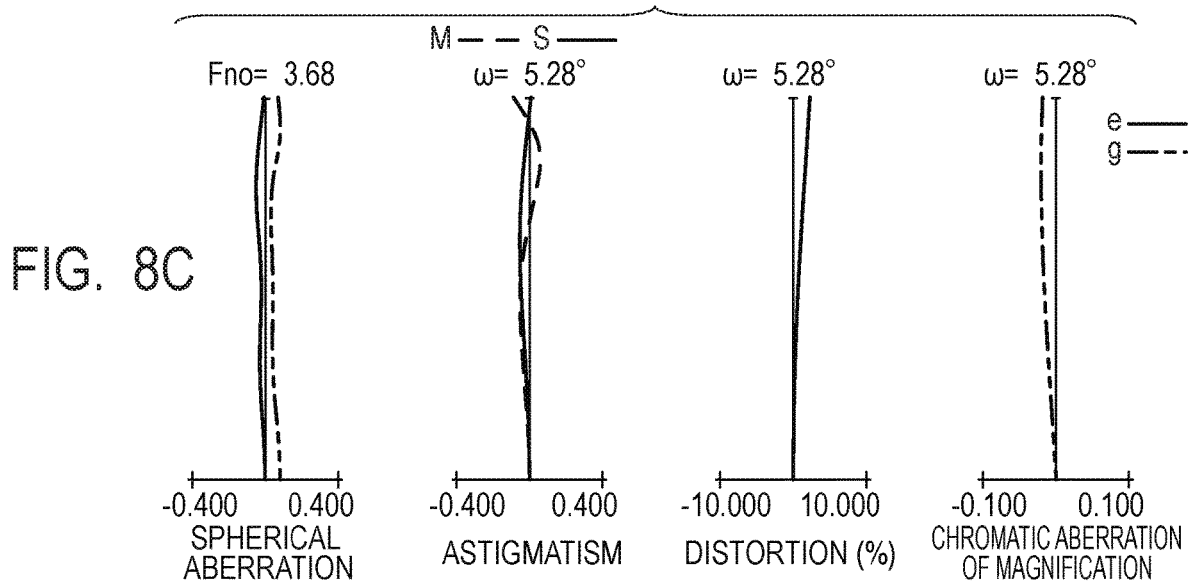
FIG. 8C shows aberration diagrams at a telephoto end and at the time of focusing at infinity in Embodiment 4.

In FIG. 7, the zoom lens includes: a lens unit L1 having a positive refractive power, which is not moved for magnification; a lens unit L2 having a negative refractive power, and configured to move (typically monotonously) toward the image plane side on the optical axis, to thereby perform magnification (zooming) from the wide angle end to the telephoto end; and a lens unit L3 having a negative refractive power, which is configured to move from the image side toward the object side on the optical axis between the wide angle end and the intermediate zoom position, and to move from the object side toward the image side on the optical axis between the intermediate zoom position and the telephoto end. The zoom lens further includes a stop SP fixed during magnification and a lens unit L4 having a positive refractive power, which is not moved for magnification. An image pickup plane I is also illustrated.

Further, the lens unit L1 consists of a first lens sub-unit L11 having a negative refractive power, a second lens sub-unit L12 having a positive refractive power, a third lens sub-unit L13 having a negative refractive power, and a fourth lens sub-unit L14 having a positive refractive power. The second lens sub-unit L12 is caused to move from the object side toward the image side, and the fourth lens sub-unit L14 is caused to move from the image side toward the object side, to thereby focus on the object at short distance.

The lens unit L1 corresponds to first to eighteenth surfaces. The first lens sub-unit L11 corresponds to first to sixth surfaces, and consists of two negative lenses and one positive lens. The second lens sub-unit L12 corresponds to seventh and eighth surfaces, and consists of one positive lens. The third lens sub-unit L13 corresponds to ninth to fourteenth surfaces, and consists of two positive lenses and two negative lenses. The fourth lens sub-unit L14 corresponds to fifteenth to eighteenth surfaces, and consists of two positive lenses.

The lens unit L2 corresponds to nineteenth to twenty-seventh surfaces, and consists of three negative lenses and two positive lenses. The lens unit L3 corresponds to twenty-eight to thirtieth surfaces, and consists of one negative lens and one positive lens. The lens unit L5 corresponds to twenty-ninth to forty-fourth surfaces, and consists of four negative lenses and eight positive lenses.

The closest distance in Embodiment 4 is a distance of 0.85 m from the image pickup surface. In this case, the amount of movement of the second lens sub-unit is M12=6.14 mm, and the amount of movement of the fourth lens sub-unit is M14=−1.42 mm. Thus, M12/M14=−4.33 is satisfied, and Conditional Expression (1) is satisfied. Regarding focusing from the object at infinity to the object at the closest distance, the amount m12 of movement of the second lens sub-unit and the amount m14 of movement of the fourth lens sub-unit at each in-focus position with respect to the position at the time of focusing on the object at infinity satisfy the following relationship:

$$m12=-4.33 \times m14.$$

The above-mentioned relationship is one example, and m12 and m14 are not required to have a linear relationship.

Corresponding values of the respective conditional expressions in Embodiment 4 are shown in Table 1. Embodiment 4 satisfies Conditional Expression (1) to Conditional Expression (7), and achieves high operability and reduction in size and weight of the zoom lens while at the same time achieving high optical performance.

Embodiment 5

Figure 9:
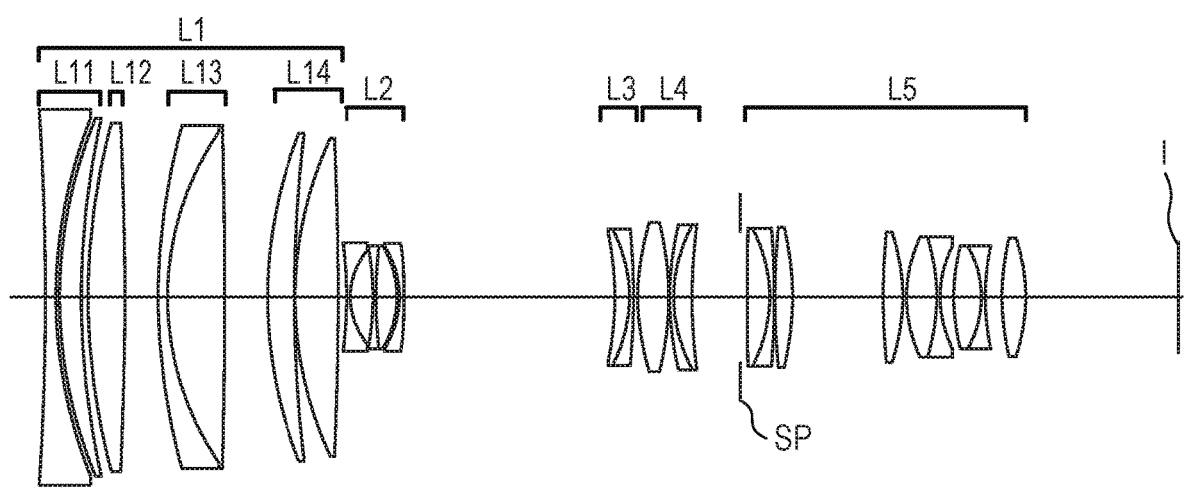
FIG. 9 is a cross-sectional view at a wide angle end and at the time of focusing at infinity in Embodiment 5 of the present invention.
Figure 10A:
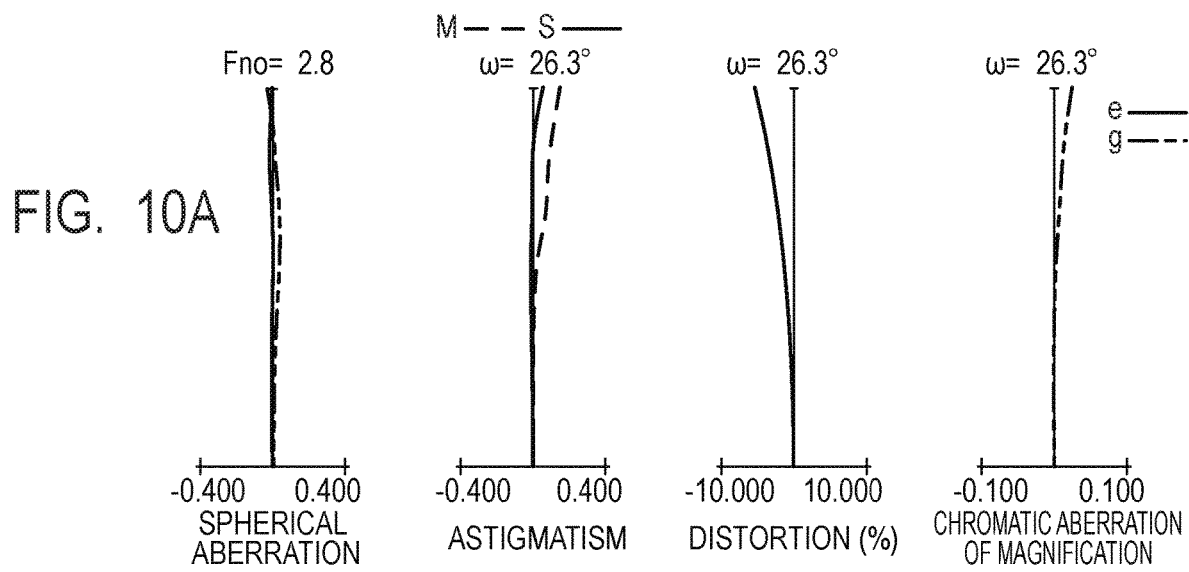
FIG. 10A shows aberration diagrams at the wide angle end and at the time of focusing at infinity in Embodiment 5.
Figure 10B:
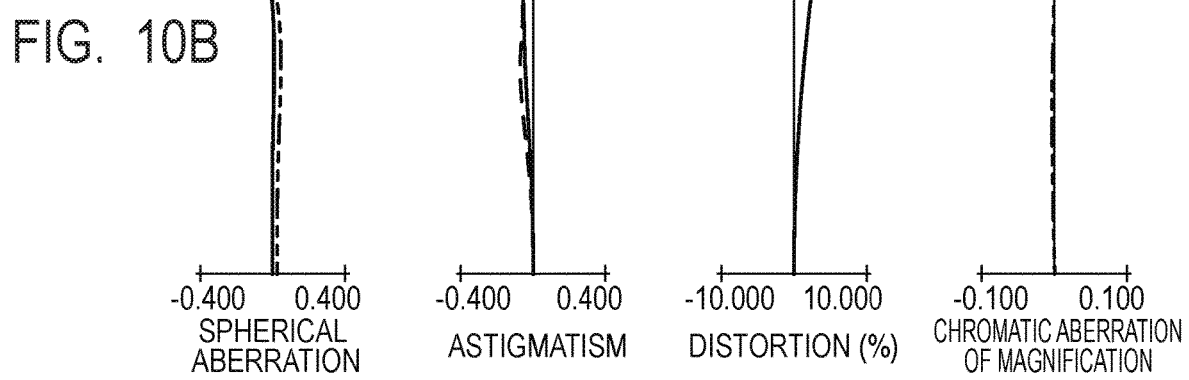
FIG. 10B shows aberration diagrams at a focal length of 88 mm and at the time of focusing at infinity in Embodiment 5.
Figure 10C:
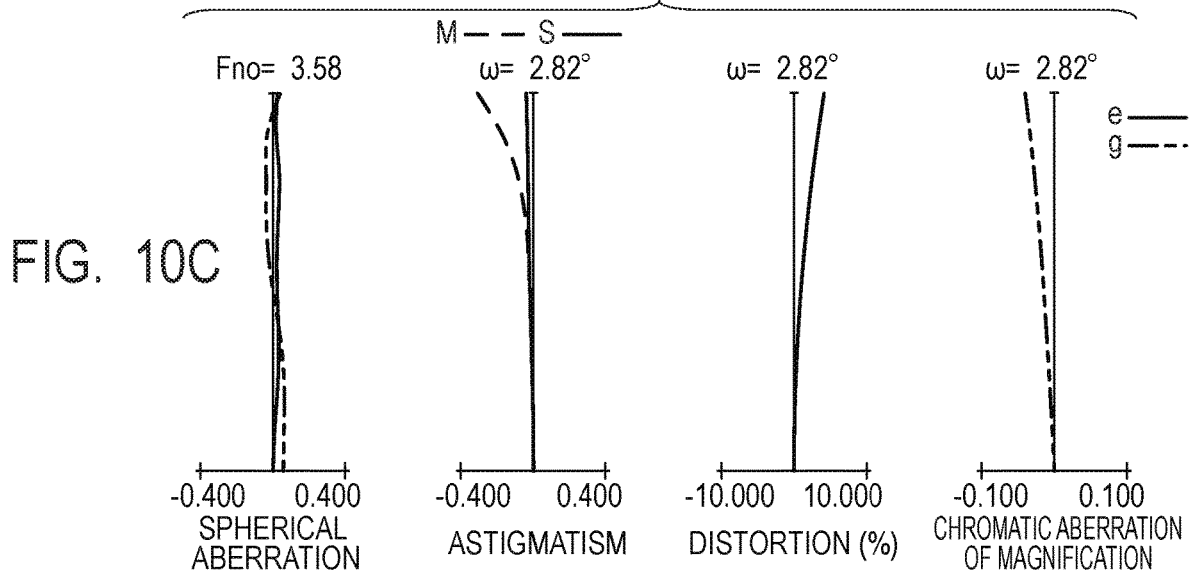
FIG. 10C shows aberration diagrams at a telephoto end and at the time of focusing at infinity in Embodiment 5.

In FIG. 9, the zoom lens includes: a lens unit L1 having a positive refractive power, which is not moved for magnification; a lens unit L2 having a negative refractive power, and configured to move (typically monotonously) toward the image plane side on the optical axis, to thereby perform magnification (zooming) from the wide angle end to the telephoto end; a lens unit L3 having a negative refractive power, which is configured to move from the image side toward the object side on the optical axis between the wide angle end and the intermediate zoom position, and to move from the object side toward the image side on the optical axis between the intermediate zoom position and the telephoto end; and a lens unit L4 having a positive refractive power, which is configured to move from the object side toward the image side on the optical axis between the wide angle end and the intermediate zoom position, and to move from the object side toward the image side on the optical axis between the intermediate zoom position and the telephoto end. The zoom lens further includes a stop SP fixed during magnification and a lens unit L5 having a positive refractive power, which is not moved for magnification. An image pickup plane I is also illustrated.

Further, the lens unit L1 consists of a first lens sub-unit L11 having a negative refractive power, a second lens sub-unit L12 having a positive refractive power, a third lens sub-unit L13 having a negative refractive power, and a fourth lens sub-unit L14 having a positive refractive power. The second lens sub-unit L12 is caused to move from the object side toward the image side, and the fourth lens sub-unit L14 is caused to move from the image side toward the object side, to thereby focus on the object at short distance.

The lens unit L1 corresponds to first to thirteenth surfaces. The first lens sub-unit L11 corresponds to first to fourth surfaces, and consists of one negative lens and one positive lens. The second lens sub-unit L12 corresponds to fifth and sixth surfaces, and consists of one positive lens. The third lens sub-unit L13 corresponds to seventh to ninth surfaces, and consists of one positive lens and one negative lens. The fourth lens sub-unit L14 corresponds to tenth to thirteenth surfaces, and consists of two positive lenses.

The lens unit L2 corresponds to fourteenth to twentieth surfaces, and consists of three negative lenses and one positive lens. The lens unit L3 corresponds to twenty-first to twenty-third surfaces, and consists of one negative lens and one positive lens. The lens unit L4 corresponds to twenty-fourth to twenty-eighth surfaces, and consists of one negative lens and two positive lenses. The lens unit L5 corresponds to twenty-ninth to forty-fourth surfaces, and consists of three negative lenses and six positive lenses.

The closest distance in Embodiment 5 is a distance of 1.2 m from the image pickup surface. In this case, the amount of movement of the second lens sub-unit is M12=7.71 mm, and the amount of movement of the fourth lens sub-unit is M14=−10.10 mm. Thus, M12/M14=−0.76 is satisfied, and Conditional Expression (1) is satisfied. Regarding focusing from the object at infinity to the object at the closest distance, the amount m12 of movement of the second lens sub-unit and the amount m14 of movement of the fourth lens sub-unit at each in-focus position with respect to the position at the time of focusing on the object at infinity satisfy the following relationship:

$$m12=-0.76 \times m14.$$

The above-mentioned relationship is one example, and m12 and m14 are not required to have a linear relationship.

Corresponding values of the respective conditional expressions in Embodiment 5 are shown in Table 1. Embodiment 5 satisfies Conditional Expression (1) to Conditional Expression (7), and achieves high operability and reduction in size and weight of the zoom lens while at the same time achieving high optical performance.

The exemplary embodiments of the present invention are described above, but the present invention is not limited to those embodiments and can be modified and changed variously within the scope of the gist thereof.

In the following, Numerical Embodiments corresponding to Embodiments of the present invention are shown. In each of the Numerical Embodiments, symbol "i" represents the order of a surface from the object side, symbol "ri" represents a curvature radius of the i-th surface from the object side, symbol "di" represents an interval between the i-th surface and the (i+1)th surface from the object side, and symbols "ndi" and "vdi" represent a refractive index and an Abbe number of an optical member between the i-th surface and the (i+1)th surface, respectively. Symbol BF represents an air-equivalent back focus. The last three surfaces correspond to a glass block, for example, a filter.

When an X axis is set in the optical axis direction, an H axis is set in a direction perpendicular to the optical axis, a direction of travel of light is defined as positive, a paraxial curvature radius is represented by R, a conic constant is represented by "k", and aspherical coefficients are represented by A3, A4, A5, A6, A7, A8, A9, A10, A11, A12, A13, A14, A15, and A16, the aspherical shape is expressed by the following expression. Further, "e-z" represents "×10$^{-z}$".

$$X = \frac{H^2/R}{1+\sqrt{1-(1+k)(H/R)^2}} + A4H^4 + A6H^6 +$$
$$A8H^8 + A10H^{10} + A12H^{12} + A14H^{14} + A16H^{16} + A3H^3 +$$
$$A5H^5 + A7H^7 + A9H^9 + A11H^{11} + A13H^{13} + A15H^{15}$$

Numerical Embodiment 1

| | | Unit: mm | | |
|---|---|---|---|---|
| | | Surface data | | |
| Surface number | r | d | nd | vd |
| 1 | −167.132 | 2.80 | 1.74951 | 35.3 |
| 2 | 151.086 | 1.60 | | |
| 3 | 154.019 | 5.33 | 1.95906 | 17.5 |
| 4 | 330.708 | 3.62 | | |
| 5 | 594.579 | 11.14 | 1.60311 | 60.6 |
| 6* | −138.092 | 8.88 | | |
| 7 | 154.488 | 2.50 | 1.84666 | 23.8 |
| 8 | 80.966 | 9.30 | 1.43875 | 94.7 |
| 9 | 496.359 | 6.12 | | |
| 10 | 126.600 | 10.01 | 1.43387 | 95.1 |
| 11 | −265.687 | 0.20 | | |
| 12 | 67.442 | 9.49 | 1.59522 | 67.7 |
| 13 | 335.462 | (Variable) | | |
| 14 | 155.823 | 0.95 | 1.75500 | 52.3 |
| 15 | 17.668 | 7.56 | | |
| 16 | −31.693 | 0.75 | 1.49700 | 81.5 |
| 17 | 73.352 | 5.80 | 1.80000 | 29.8 |
| 18 | −25.439 | 0.94 | | |
| 19 | −21.645 | 1.20 | 1.76385 | 48.5 |
| 20* | −261.202 | (Variable) | | |
| 21 | −67.686 | 4.15 | 1.80810 | 22.8 |
| 22 | −32.336 | 1.10 | 1.90525 | 35.0 |
| 23 | −141.104 | (Variable) | | |
| 24* | 76.972 | 7.29 | 1.64000 | 60.1 |
| 25 | −59.614 | 0.19 | | |
| 26 | 60.585 | 1.10 | 1.85478 | 24.8 |
| 27 | 37.997 | 5.41 | 1.48749 | 70.2 |
| 28 | 190.983 | (Variable) | | |
| 29 (Stop) | ∞ | 2.07 | | |
| 30 | −27,250.420 | 4.98 | 1.48749 | 70.2 |
| 31 | −49.195 | 1.20 | 2.00100 | 29.1 |
| 32 | 156.424 | 0.69 | | |
| 33 | 93.126 | 5.55 | 1.72825 | 28.5 |
| 34 | −84.236 | 43.77 | | |
| 35 | 73.828 | 7.00 | 1.43875 | 94.7 |
| 36 | −63.688 | 0.95 | | |
| 37 | 52.065 | 8.49 | 1.80810 | 22.8 |
| 38 | −51.533 | 0.90 | 1.95375 | 32.3 |
| 39 | 45.461 | 5.00 | | |
| 40 | 46.480 | 8.76 | 1.48749 | 70.2 |
| 41 | −32.543 | 1.00 | 2.00100 | 29.1 |
| 42 | 53.732 | 1.36 | | |
| 43 | 43.575 | 7.72 | 1.62004 | 36.3 |
| 44 | −80.833 | 43.38 | | |
| Image plane | ∞ | | | |

Aspherical surface data

Sixth surface

K = −1.51267e+001  A4 = −6.49448e−007  A6 = 2.35413e−010  A8 = −9.02147e−014
A10 = 2.62134e−017  A12 = −3.74536e−021

Twentieth surface

K = 3.72020e+001  A4 = −9.83020e−006  A6 = −4.95860e−009  A8 = −2.35672e−011
A10 = 5.83243e−014  A12 = −2.06036e−016

Twenty-fourth surface

K = −1.45023e+000  A4 = −1.99598e−006  A6 = 6.26743e−010  A8 = 8.22589e−013
A10 = −4.34519e−015  A12 = 5.01150e−018

Various data
Zoom ratio 9.62

| | Wide angle | Intermediate | Telephoto |
|---|---|---|---|
| Focal length | 26.00 | 77.47 | 249.99 |
| F-number | 2.74 | 2.73 | 3.67 |
| Half angle of view | 29.65 | 10.82 | 3.39 |
| Image height | 14.80 | 14.80 | 14.80 |
| Total lens length | 312.28 | 312.28 | 312.28 |

-continued

| Unit: mm | | | |
|---|---|---|---|
| BF | 43.38 | 43.38 | 43.38 |
| d13 | 0.99 | 34.04 | 51.84 |
| d20 | 54.15 | 4.53 | 2.01 |
| d23 | 0.91 | 18.11 | 0.97 |
| d28 | 5.99 | 5.35 | 7.22 |

| Zoom lens unit data | | |
|---|---|---|
| Unit | First surface | Focal length |
| 1 | 1 | 80.63 |
| 2 | 14 | −18.55 |
| 3 | 21 | −119.24 |
| 4 | 24 | 47.73 |
| 5 | 29 | 122.66 |

Numerical Embodiment 2

| Unit: mm | | | |
|---|---|---|---|
| Surface data | | | |
| Surface number | r | d | nd | vd |
|---|---|---|---|---|
| 1 | −657.990 | 2.50 | 1.73800 | 32.3 |
| 2 | 114.317 | 3.77 | | |
| 3 | 152.390 | 5.79 | 1.95906 | 17.5 |
| 4 | 318.356 | 11.20 | | |
| 5 | −154.423 | 2.50 | 1.73800 | 32.3 |
| 6 | −741.948 | 2.25 | | |
| 7 | 357.229 | 13.33 | 1.49700 | 81.5 |
| 8* | −116.922 | 6.10 | | |
| 9 | 127.623 | 2.20 | 1.85478 | 24.8 |
| 10 | 80.088 | 9.86 | 1.43875 | 94.7 |
| 11 | 1,123.633 | 4.83 | | |
| 12 | 122.619 | 10.59 | 1.43387 | 95.1 |
| 13 | −207.565 | 0.13 | | |
| 14 | 63.481 | 9.05 | 1.61772 | 49.8 |
| 15 | 223.813 | (Variable) | | |
| 16* | 61.240 | 1.00 | 1.90525 | 35.0 |
| 17 | 13.710 | 7.46 | | |
| 18 | −28.938 | 5.81 | 1.80810 | 22.8 |
| 19 | −11.338 | 0.75 | 1.88300 | 40.8 |
| 20 | 123.389 | 0.94 | | |
| 21 | 45.707 | 2.80 | 1.80810 | 22.8 |
| 22 | −2,314.038 | (Variable) | | |
| 23 | −34.905 | 0.75 | 1.80440 | 39.6 |
| 24 | 68.760 | 3.63 | 1.80810 | 22.8 |
| 25 | −113.823 | (Variable) | | |
| 26 | 96.567 | 5.35 | 1.64000 | 60.1 |
| 27* | −37.867 | (Variable) | | |
| 28 (Stop) | ∞ | 1.50 | | |
| 29 | 34.349 | 5.67 | 1.51823 | 58.9 |
| 30 | −65.859 | 1.00 | 1.88300 | 40.8 |
| 31 | 70.896 | 35.58 | | |
| 32 | 124.611 | 4.37 | 1.48749 | 70.2 |
| 33 | −47.898 | 0.13 | | |
| 34 | 251.790 | 1.00 | 1.88300 | 40.8 |
| 35 | 39.227 | 4.66 | 1.49700 | 81.5 |
| 36 | 168.269 | 0.99 | | |
| 37 | 56.843 | 7.68 | 1.48749 | 70.2 |
| 38 | −29.834 | 1.00 | 1.88300 | 40.8 |
| 39 | −81.358 | 2.30 | | |
| 40 | 50.091 | 4.24 | 1.49700 | 81.5 |
| 41 | −250.873 | 5.00 | | |
| 42 | ∞ | 33.00 | 1.60859 | 46.4 |
| 43 | ∞ | 13.20 | 1.51633 | 64.1 |
| 44 | ∞ | 7.00 | | |
| Image plane | ∞ | | | |

-continued

| Unit: mm |
|---|

| Aspherical surface data |
|---|

| Eighth surface |
|---|

K = −6.10184e+000   A4 = −3.26588e−007   A6 = 7.07340e−011   A8 = −1.02382e−014
A10 = −1.94486e−018   A12 = 8.94096e−022

| Sixteenth surface |
|---|

K = −5.69781e+001   A4 = 3.74163e−005   A6 = −2.44545e−007   A8 = 1.46596e−009
A10 = −5.31107e−012   A12 = 8.09042e−015

| Twenty-seventh surface |
|---|

K = 3.24503e+000   A4 = 1.14723e−005   A6 = 1.03572e−008   A8 = 8.31250e−011
A10 = −2.66949e−013   A12 = 9.48372e−016

| Various data Zoom ratio 21.00 | | | |
|---|---|---|---|
|  | Wide angle | Intermediate | Telephoto |
| Focal length | 7.50 | 32.75 | 157.50 |
| F-number | 1.90 | 1.90 | 2.59 |
| Half angle of view | 36.25 | 9.53 | 2.00 |
| Image height | 5.50 | 5.50 | 5.50 |
| Total lens length | 304.86 | 304.86 | 304.86 |
| BF | 7.00 | 7.00 | 7.00 |
| d15 | 0.89 | 37.84 | 55.23 |
| d22 | 61.05 | 3.20 | 5.15 |
| d25 | 0.99 | 15.68 | 1.19 |
| d27 | 1.00 | 7.20 | 2.36 |

| Zoom lens unit data | | |
|---|---|---|
| Unit | First surface | Focal length |
| 1 | 1 | 69.07 |
| 2 | 16 | −12.56 |
| 3 | 23 | −64.49 |
| 4 | 26 | 43.00 |
| 5 | 28 | 50.81 |

Numerical Embodiment 3

| Unit: mm |
|---|

| Surface data | | | | |
|---|---|---|---|---|
| Surface number | r | d | nd | vd |
| 1 | −588.552 | 5.50 | 1.72916 | 54.7 |
| 2 | 297.617 | 0.50 | | |
| 3 | 294.162 | 10.76 | 1.84666 | 23.8 |
| 4 | 565.202 | 7.28 | | |
| 5 | 1,313.835 | 18.88 | 1.49700 | 81.5 |
| 6 | −384.236 | 13.68 | | |
| 7 | 539.621 | 4.50 | 1.85478 | 24.8 |
| 8 | 247.857 | 1.37 | | |
| 9 | 257.585 | 24.88 | 1.43387 | 95.1 |
| 10 | −638.470 | 18.66 | | |
| 11 | 233.536 | 27.24 | 1.43387 | 95.1 |
| 12 | −698.972 | 1.50 | | |
| 13 | 183.086 | 13.56 | 1.49700 | 81.5 |
| 14 | 333.198 | (Variable) | | |
| 15* | ∞ | 1.80 | 1.81600 | 46.6 |
| 16 | 64.053 | 11.65 | | |
| 17 | −99.758 | 1.60 | 1.43875 | 94.9 |
| 18 | 73.260 | 2.01 | | |
| 19 | 80.716 | 8.18 | 1.85478 | 24.8 |
| 20 | −282.901 | 1.60 | 1.76385 | 48.5 |
| 21 | 208.041 | 7.20 | | |
| 22 | −72.364 | 1.60 | 1.43875 | 94.9 |
| 23 | 554.961 | (Variable) | | |

-continued

| Unit: mm | | | | |
|---|---|---|---|---|
| 24 | 138.354 | 9.07 | 1.60311 | 60.6 |
| 25* | 11,696.651 | 0.20 | | |
| 26 | 112.682 | 16.67 | 1.43875 | 94.9 |
| 27 | −165.166 | 0.20 | | |
| 28 | 342.060 | 2.50 | 1.85478 | 24.8 |
| 29 | 126.760 | (Variable) | | |
| 30 | 153.968 | 8.21 | 1.60311 | 60.6 |
| 31* | −1,029.606 | 0.20 | | |
| 32 | 94.556 | 2.50 | 1.76385 | 48.5 |
| 33 | 51.464 | 0.45 | | |
| 34 | 51.471 | 15.69 | 1.43875 | 94.9 |
| 35 | ∞ | (Variable) | | |
| 36 (Stop) | ∞ | 4.23 | | |
| 37 | −179.174 | 1.40 | 1.78590 | 44.2 |
| 38 | 39.896 | 4.02 | | |
| 39 | 41.414 | 5.43 | 1.84666 | 23.8 |
| 40 | −450.055 | 2.53 | | |
| 41 | −69.977 | 1.40 | 1.81600 | 46.6 |
| 42 | 72.637 | 15.04 | | |
| 43 | 517.572 | 1.50 | 1.69680 | 55.5 |
| 44 | 68.639 | 4.04 | 1.74400 | 44.8 |
| 45 | −1,422.272 | 2.93 | | |
| 46 | −157.706 | 1.50 | 1.78590 | 44.2 |
| 47 | 82.559 | 9.19 | 1.53172 | 48.8 |
| 48 | −42.815 | 9.44 | | |
| 49 | 51.682 | 6.77 | 1.65160 | 58.5 |
| 50 | −181.443 | 0.61 | | |
| 51 | 676.855 | 1.50 | 1.88300 | 40.8 |
| 52 | 33.581 | 10.35 | 1.48749 | 70.2 |
| 53 | −62.036 | 0.12 | | |
| 54 | −249.244 | 3.63 | 1.51823 | 58.9 |
| 55 | −53.874 | 1.50 | 1.91650 | 31.6 |
| 56 | −617.788 | 0.18 | | |
| 57 | 99.062 | 2.56 | 1.69895 | 30.1 |
| 58 | 772.409 | 5.94 | | |
| 59 | ∞ | 63.04 | 1.60859 | 46.4 |
| 60 | ∞ | 8.70 | 1.51633 | 64.2 |
| 61 | ∞ | 17.84 | | |
| Image plane | ∞ | | | |

Aspherical surface data

Fifteenth surface

K = −2.93730e+009  A4 = 1.51822e−007  A6 = 1.26068e−011  A8 = −4.91474e−014
A10 = 3.83191e−017  A12 = −1.15426e−020

Twenty-fifth surface

K = −6.41338e+005  A4 = 3.31546e−007  A6 = −4.18293e−011  A8 = 3.76017e−014
A10 = −1.41189e−017  A12 = 2.22963e−021

Thirty-first surface

K = 4.31067e+002  A4 = 4.01387e−008  A6 = 2.27701e−011  A8 = −5.41983e−015
A10 = 2.27274e−018  A12 = 7.70062e−022

Various data
Zoom ratio 40.00

| | Wide angle | Intermediate | Telephoto |
|---|---|---|---|
| Focal length | 17.00 | 95.00 | 680.00 |
| F-number | 2.20 | 2.20 | 4.00 |
| Half angle of view | 28.55 | 5.56 | 0.78 |
| Image height | 9.25 | 9.25 | 9.25 |
| Total lens length | 717.85 | 717.85 | 717.85 |
| BF | 17.84 | 17.84 | 17.84 |
| d14 | 6.04 | 124.65 | 177.41 |
| d23 | 264.58 | 111.77 | 2.58 |
| d29 | 19.18 | 18.75 | 3.96 |
| d35 | 3.00 | 37.64 | 108.85 |

Zoom lens unit data

| Unit | First surface | Focal length |
|---|---|---|
| 1 | 1 | 252.79 |
| 2 | 15 | −38.79 |

-continued

| | Unit: mm | |
|---|---|---|
| 3 | 24 | 146.48 |
| 4 | 30 | 157.73 |
| 5 | 36 | 83.76 |

Numerical Embodiment 4

| Unit: mm | | | | |
|---|---|---|---|---|
| Surface data | | | | |
| Surface number | r | d | nd | vd |
| 1 | 303.002 | 3.20 | 1.77250 | 49.6 |
| 2 | 55.228 | 24.25 | | |
| 3 | −109.283 | 2.70 | 1.77250 | 49.6 |
| 4 | −949.635 | 0.20 | | |
| 5 | 120.281 | 5.64 | 1.92286 | 20.9 |
| 6 | 250.546 | 2.00 | | |
| 7 | 217.047 | 12.08 | 1.62041 | 60.3 |
| 8* | −138.331 | 5.92 | | |
| 9 | 1,402.427 | 9.79 | 1.49700 | 81.5 |
| 10 | −98.925 | 2.50 | 1.80000 | 29.8 |
| 11 | −265.350 | 0.20 | | |
| 12 | 149.654 | 2.50 | 1.73800 | 32.3 |
| 13 | 55.521 | 16.88 | 1.49700 | 81.5 |
| 14 | −472.637 | 2.14 | | |
| 15 | 129.099 | 10.70 | 1.53775 | 74.7 |
| 16 | −169.638 | 0.20 | | |
| 17 | 81.356 | 6.42 | 1.76385 | 48.5 |
| 18 | 200.443 | (Variable) | | |
| 19* | 52.241 | 1.20 | 1.88300 | 40.8 |
| 20 | 18.862 | 4.87 | | |
| 21 | 170.420 | 4.31 | 1.84666 | 23.8 |
| 22 | −33.527 | 0.70 | 1.77250 | 49.6 |
| 23 | 72.187 | 4.00 | | |
| 24 | −24.222 | 0.70 | 1.72916 | 54.7 |
| 25 | 432.864 | 0.16 | | |
| 26 | 67.073 | 4.00 | 1.65412 | 39.7 |
| 27 | −59.181 | (Variable) | | |
| 28 | −35.290 | 0.90 | 1.65160 | 58.5 |
| 29 | 116.270 | 2.49 | 1.80810 | 22.8 |
| 30 | −575.295 | (Variable) | | |
| 31 (Stop) | ∞ | 1.30 | | |
| 32 | 971.289 | 4.44 | 1.75500 | 52.3 |
| 33 | −59.576 | 0.20 | | |
| 34 | 67.388 | 4.89 | 1.61800 | 63.3 |
| 35 | −223.816 | 0.20 | | |
| 36 | 82.121 | 5.18 | 1.49700 | 81.5 |
| 37 | −100.168 | 1.20 | 2.00100 | 29.1 |
| 38 | 1,380.466 | 0.20 | | |
| 39 | 51.870 | 7.60 | 1.51633 | 64.1 |
| 40 | −57.577 | 1.10 | 1.77250 | 49.6 |
| 41 | 122.553 | 26.76 | | |
| 42 | 52.095 | 4.80 | 1.48749 | 70.2 |
| 43 | −52.515 | 1.79 | | |
| 44 | 28.530 | 5.69 | 1.48749 | 70.2 |
| 45 | −43.203 | 1.00 | 2.00069 | 25.5 |
| 46 | 26.845 | 2.89 | | |
| 47 | −762.404 | 6.91 | 1.80810 | 22.8 |
| 48 | −16.178 | 1.00 | 1.88300 | 40.8 |
| 49 | −301.630 | 7.95 | | |
| 50 | 35.204 | 4.76 | 1.48749 | 70.2 |
| 51 | −32,620.679 | 37.93 | | |
| Image plane | ∞ | | | |

Aspherical surface data

Eighth surface

K = 6.33538e−001  A4 = 2.13961e−007  A6 = 2.49684e−011  A8 = −1.21667e−013
A10 = 2.02965e−016  A12 = −1.87004e−019  A14 = 8.67842e−023  A16 = −1.59245e−026

-continued

| Unit: mm |
|---|

| Nineteenth surface |
|---|

K = 1.60063e+000   A4 = −3.65682e−007   A6 = −5.37872e−009   A8 = −6.29839e−012
A10 = 2.76307e−013   A12 = −2.46779e−015   A14 = 8.97129e−018   A16 = −1.21330e−020

| Various data Zoom ratio 8.00 | | | |
|---|---|---|---|
|  | Wide angle | Intermediate | Telephoto |
| Focal length | 20.00 | 70.00 | 160.00 |
| F-number | 2.80 | 2.80 | 3.68 |
| Half angle of view | 36.50 | 11.94 | 5.28 |
| Image height | 14.80 | 14.80 | 14.80 |
| Total lens length | 310.02 | 310.02 | 310.02 |
| BF | 37.93 | 37.93 | 37.93 |
| d18 | 0.39 | 33.49 | 44.85 |
| d27 | 41.79 | 5.40 | 5.82 |
| d30 | 9.40 | 12.69 | 0.90 |

| Zoom lens unit data | | |
|---|---|---|
| Unit | First surface | Focal length |
| 1 | 1 | 53.26 |
| 2 | 19 | −21.69 |
| 3 | 28 | −63.84 |
| 4 | 31 | 39.52 |

Numerical Embodiment 5

| Unit: mm |
|---|

| Surface data | | | | |
|---|---|---|---|---|
| Surface number | r | d | nd | vd |
| 1 | −743.929 | 2.80 | 1.74951 | 35.3 |
| 2 | 127.028 | 0.96 | | |
| 3 | 122.888 | 5.79 | 1.95906 | 17.5 |
| 4 | 213.798 | 1.82 | | |
| 5 | 174.979 | 9.85 | 1.60311 | 60.6 |
| 6* | −717.708 | 8.88 | | |
| 7 | 166.372 | 2.50 | 1.84666 | 23.8 |
| 8 | 77.647 | 15.25 | 1.43875 | 94.7 |
| 9 | −1,669.386 | 11.50 | | |
| 10 | 116.892 | 7.27 | 1.43387 | 95.1 |
| 11 | 360.650 | 0.20 | | |
| 12 | 99.645 | 11.54 | 1.61800 | 63.3 |
| 13 | −884.714 | (Variable) | | |
| 14 | −112.589 | 0.95 | 1.72916 | 54.7 |
| 15 | 19.479 | 6.12 | | |
| 16 | −71.554 | 0.75 | 1.49700 | 81.5 |
| 17 | 124.877 | 5.65 | 1.85478 | 24.8 |
| 18 | −26.527 | 0.63 | | |
| 19 | −25.329 | 1.20 | 1.90525 | 35.0 |
| 20* | −314.134 | (Variable) | | |
| 21 | −81.871 | 3.89 | 1.80810 | 22.8 |
| 22 | −38.615 | 1.10 | 1.90525 | 35.0 |
| 23 | −177.519 | (Variable) | | |
| 24* | 58.283 | 8.34 | 1.72916 | 54.7 |
| 25 | −79.807 | 0.20 | | |
| 26 | 78.800 | 1.10 | 1.85478 | 24.8 |
| 27 | 39.714 | 4.88 | 1.43875 | 94.7 |
| 28 | 140.505 | (Variable) | | |
| 29 (Stop) | ∞ | 1.93 | | |
| 30 | 909.917 | 6.01 | 1.48749 | 70.2 |
| 31 | −38.868 | 1.20 | 2.00100 | 29.1 |
| 32 | −228.392 | 0.15 | | |
| 33 | 180.146 | 4.74 | 1.72825 | 28.5 |
| 34 | −79.009 | 24.36 | | |
| 35 | 173.958 | 5.26 | 1.43875 | 94.7 |

-continued

| Unit: mm | | | | |
|---|---|---|---|---|
| 36 | −53.593 | 0.99 | | |
| 37 | 37.156 | 8.07 | 1.80810 | 22.8 |
| 38 | −53.142 | 0.90 | 1.95375 | 32.3 |
| 39 | 30.023 | 3.64 | | |
| 40 | 52.973 | 7.43 | 1.48749 | 70.2 |
| 41 | −27.317 | 1.00 | 2.00100 | 29.1 |
| 42 | 64.738 | 4.49 | | |
| 43 | 68.229 | 6.33 | 1.62004 | 36.3 |
| 44 | −49.277 | 40.97 | | |
| Image plane | ∞ | | | |

Aspherical surface data

Sixth surface

K = −4.06998e+002    A4 = −4.85801e−008    A6 = 4.75097e−011    A8 = −1.57424e−014
A10 = 3.43992e−018    A12 = −3.26517e−022

Twentieth surface

K = 3.63463e+002    A4 = −7.73327e−006    A6 = −6.55751e−009    A8 = −6.32564e−012
A10 = −4.60157e−014    A12 = −5.86658e−017

Twenty-fourth surface

K = −1.83818e+000    A4 = −1.47814e−006    A6 = 3.85158e−010    A8 = 1.29703e−012
A10 = −4.68345e−015    A12 = 4.67622e−018

Various data
Zoom ratio 10.00

| | Wide angle | Intermediate | Telephoto |
|---|---|---|---|
| Focal length | 30.00 | 88.00 | 300.00 |
| F-number | 2.80 | 2.80 | 3.52 |
| Half angle of view | 26.26 | 9.55 | 2.82 |
| Image height | 14.80 | 14.80 | 14.80 |
| Total lens length | 303.33 | 303.33 | 303.33 |
| BF | 40.97 | 40.97 | 40.97 |
| d13 | 2.26 | 40.82 | 61.58 |
| d20 | 56.52 | 4.00 | 1.54 |
| d23 | 1.07 | 21.03 | 0.99 |
| d28 | 12.85 | 6.86 | 8.60 |

Zoom lens unit data

| Unit | First surface | Focal length |
|---|---|---|
| 1 | 1 | 100.38 |
| 2 | 14 | −19.98 |
| 3 | 21 | −138.83 |
| 4 | 24 | 52.57 |
| 5 | 29 | 119.93 |

TABLE 1

| Conditional Expression | Embodiment 1 | Embodiment 2 | Embodiment 3 | Embodiment 4 | Embodiment 5 |
|---|---|---|---|---|---|
| (1) M12/M14 | −1.68 | −1.33 | −0.72 | −4.33 | −0.76 |
| (2) F11/F12 | −0.88 | −0.67 | −0.72 | −0.51 | −1.20 |
| (3) F14/F1 | 1.03 | 1.15 | 1.61 | 1.45 | 1.07 |
| (4) vdP13 − vdN13 | 70.88 | 69.86 | 70.30 | 50.49 | 70.88 |
| (5) F1/F2 | −4.35 | −5.50 | −6.52 | −2.46 | −5.02 |
| (6) vdP12 | 60.64 | 81.54 | 81.54 | 60.29 | 60.64 |
| (7) vdP11 − vdN11 | −17.86 | −14.86 | −30.90 | −28.72 | −17.86 |
| M12 | 8.24 | 4.97 | 12.76 | 6.14 | 7.71 |
| M14 | −4.91 | −3.74 | −17.70 | −1.42 | −10.10 |
| F1 | 80.63 | 69.07 | 252.79 | 53.26 | 100.38 |
| F2 | −18.55 | −12.56 | −38.79 | −21.69 | −19.98 |
| F11 | −163.34 | −119.99 | −431.11 | −70.29 | −280.95 |
| F12 | 186.15 | 178.39 | 598.64 | 137.43 | 233.31 |
| F14 | 82.80 | 79.13 | 406.05 | 77.34 | 107.68 |
| vdP11 | 17.47 | 17.47 | 23.78 | 20.88 | 17.47 |

TABLE 1-continued

| vdN11 | 35.33 | 32.33 | 54.68 | 49.60 | 35.33 |
| vdP12 | 60.64 | 81.54 | 81.54 | 60.29 | 60.64 |
| vdP13 | 94.66 | 94.66 | 95.10 | 81.54 | 94.66 |
| vdN13 | 23.78 | 24.80 | 24.80 | 31.05 | 23.78 |

(Image Pickup Apparatus)

Figure 11:
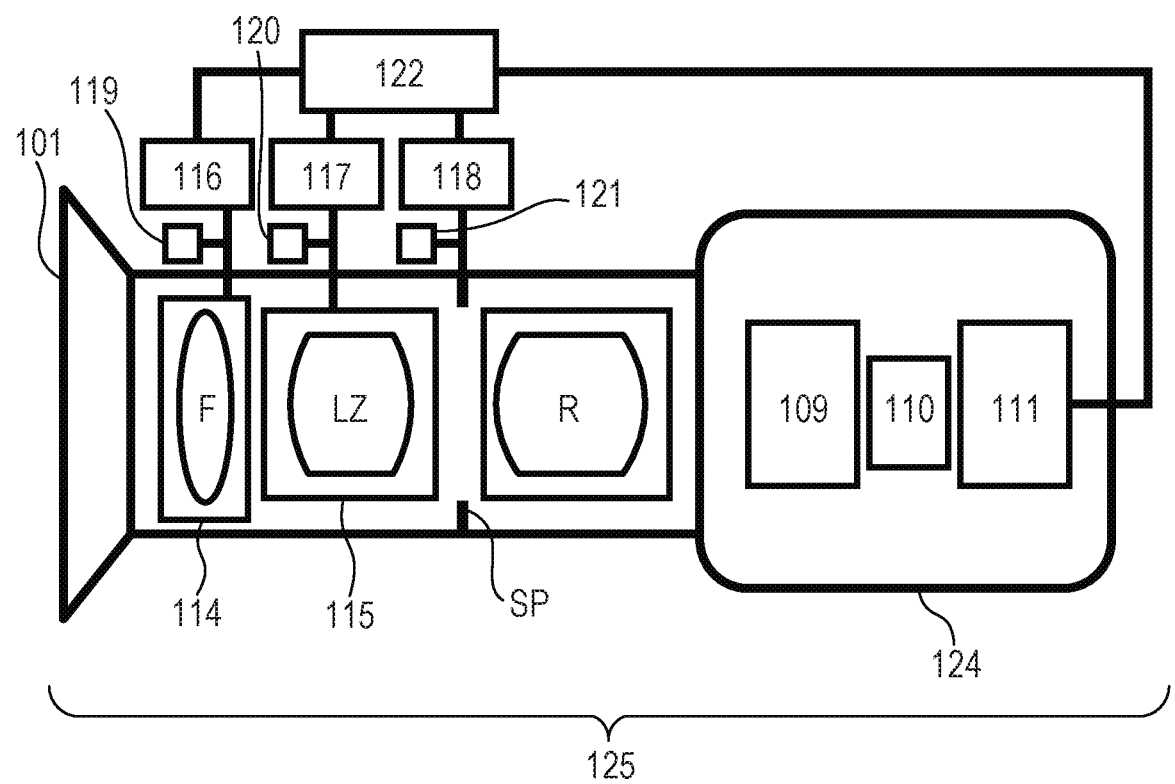
FIG. 11 is a schematic diagram of a main part of an image pickup apparatus according to one embodiment of the present invention.

FIG. 11 is a schematic diagram of a main part of an image pickup apparatus using the zoom lens according to any one of Embodiments 1 to 5 as a photographing optical system. In FIG. 11, there are illustrated the zoom lens according to any one of Embodiments 1 to 5, which is denoted by 101, and a camera 124. The zoom lens 101 is configured to be detachably attachable to the camera 124. An image pickup apparatus 125 is formed by attaching the zoom lens 101 to the camera 124. The zoom lens 101 includes a first lens unit F, a second lens unit having a negative refractive power, which is configured to move for magnification, and a rear lens unit having a positive refractive power as a whole, which consists of two or three lens units including at least one lens unit configured to move for magnification. In FIG. 11, the second lens unit and a lens unit configured to move for magnification within the rear lens unit are illustrated as a lens unit LZ, and a lens unit configured not to move for magnification within the rear lens unit is illustrated as a lens unit R. The first lens unit F includes a lens unit for focusing, which is configured to move on an optical axis for focusing.

The aperture stop is denoted by SP. Drive mechanisms 114 and 115, such as helicoids and cams, are configured to drive the focus lens unit and the lens unit LZ in the optical axis direction, respectively.

Motors (drive units) 116 to 118 are configured to electrically drive the drive mechanisms 114 and 115 and the aperture stop SP, respectively. Detectors 119 to 121, such as encoders, potentiometers, or photosensors, are configured to detect positions of the focus lens unit and the lens unit LZ on the optical axis, and the aperture diameter of the aperture stop SP, respectively. The camera 124 includes a glass block 109, which corresponds to an optical filter of the camera 124, and an image pickup element (photoelectric conversion element) 110, such as a charge coupled device (CCD) sensor or a complementary metal oxide semiconductor (CMOS) sensor, which is configured to receive an object image (optical image) formed by the zoom lens 101.

Moreover, central processing units (CPUs) 111 and 122 are configured to control various kinds of driving of the camera 124 and the zoom lens 101. The zoom lens according to each Embodiment of the present invention is applied to a television camera as described above, to thereby achieve the image pickup apparatus having high optical performance.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-139911, filed Jul. 30, 2019, which is hereby incorporated by reference herein in its entirety.

What is claimed is:

1. A zoom lens comprising in order from an object side to an image side:

a first lens unit having a positive refractive power and configured not to move for a change in magnification of the zoom lens;

a second lens unit having a negative refractive power and configured to move for a change in magnification of the zoom lens; and two or three rear lens units having a positive refractive power as a whole, at least one of the two or three rear lens units being configured to move for a change in magnification of the zoom lens, wherein an interval between lens units in each pair of adjacent two lens units is changed for a change in magnification of the zoom lens, wherein the first lens unit includes a first lens sub-unit having a negative refractive power and configured not to move for focusing of the zoom lens, a second lens sub-unit having a positive refractive power and configured to move for focusing of the zoom lens, a third lens sub-unit configured not to move for focusing of the zoom lens, and a fourth lens sub-unit having a positive refractive power, and configured to move for focusing of the zoom lens, and wherein the following conditional expression is satisfied:

$$-10.0 < M12/M14 < -0.1,$$

where M12 represents an amount of movement of the second lens sub-unit for focusing of the zoom lens from infinity to a minimum object distance, and M14 represents an amount of movement of the fourth lens sub-unit for focusing of the zoom lens from infinity to the minimum object distance.

2. The zoom lens according to claim 1, wherein the first lens unit includes a fifth lens sub-unit having a positive refractive power and configured to move for focusing of the zoom lens.

3. The zoom lens according to claim 1, wherein the following conditional expression is satisfied:

$$-1.5 < F11/F12 < -0.5,$$

where F11 represents a focal length of the first lens sub-unit, and F12 represents a focal length of the second lens sub-unit.

4. The zoom lens according to claim 1, wherein the following conditional expression is satisfied:

$$1.0 < F14/F1 < 2.0,$$

where F1 represents a focal length of the first lens unit, and F14 represents a focal length of the fourth lens sub-unit.

5. The zoom lens according to claim 1, wherein the third lens sub-unit includes a positive lens and a negative lens, and wherein the following conditional expression is satisfied:

$$50.0 < vdP13 - vdN13 < 78.0,$$

where vdP13 represents an average abbe number of a positive lens included in the third lens sub-unit, and vdN13 represents an average abbe number of a negative lens included in the third lens sub-unit.

6. The zoom lens according to claim 1, wherein the following conditional expression is satisfied:

$$-10.0 < F1/F2 < -2.0,$$

where F1 represents a focal length of the first lens sub-unit, and F2 represents a focal length of the second lens sub-unit.

7. The zoom lens according to claim 1,
wherein the second lens sub-unit consists of one positive lens, and
wherein the following conditional expression is satisfied:

$$50.0 < vdP12 < 95.1,$$

where vdP12 represents an abbe number of the one positive lens.

8. The zoom lens according to claim 7, wherein the one positive lens has an aspherical surface.

9. The zoom lens according to claim 1,
wherein the first lens sub-unit includes a positive lens and a negative lens, and
wherein the following conditional expression is satisfied:

$$-40.0 < vdP11 - vdN11 < -10.0,$$

where vdP11 represents an average abbe number of the positive lens included in the first lens sub-unit, and vdN11 represents an average abbe number of the negative lens included in the first lens sub-unit.

10. An image pickup apparatus comprising:
  a zoom lens comprising in order from an object side to an image side:
    a first lens unit having a positive refractive power and configured not to move for a change in magnification of the zoom lens;
    a second lens unit having a negative refractive power and configured to move for a change in magnification of the zoom lens; and
    two or three rear lens units having a positive refractive power as a whole, at least one of the two or three rear lens units being configured to move for a change in magnification of the zoom lens,
  wherein an interval between lens units in each pair of adjacent two lens units is changed for a change in magnification of the zoom lens,
  wherein the first lens unit includes a first lens sub-unit having a negative refractive power and configured not to move for focusing of the zoom lens, a second lens sub-unit having a positive refractive power and configured to move for focusing of the zoom lens, a third lens sub-unit configured not to move for focusing of the zoom lens, and a fourth lens sub-unit having a positive refractive power and configured to move for focusing of the zoom lens, and
  wherein the following conditional expression is satisfied:

$$-10.0 < M12/M14 < -0.1,$$

where M12 represents an amount of movement of the second lens sub-unit for focusing of the zoom lens from infinity to a minimum object distance, and M14 represents an amount of movement of the fourth lens sub-unit for focusing of the zoom lens from infinity to the minimum object distance; and
  an image pickup element configured to pick up an image formed by the zoom lens.

* * * * *